(12) United States Patent
Ramamurthy et al.

(10) Patent No.: US 11,177,660 B2
(45) Date of Patent: Nov. 16, 2021

(54) SYSTEM AND METHOD FOR POWER CONVERTER CONTROL FOR VIRTUAL IMPEDANCE

(71) Applicant: Mitsubishi Electric Power Products, Inc., Warrendale, PA (US)

(72) Inventors: Shyam Sunder Ramamurthy, Pittsburgh, PA (US); Christopher Joseph Lee, Johnstown, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 20 days.

(21) Appl. No.: 16/752,952

(22) Filed: Jan. 27, 2020

(65) Prior Publication Data

US 2021/0234370 A1 Jul. 29, 2021

(51) Int. Cl.
*H02J 3/18* (2006.01)
*H02M 7/5395* (2006.01)

(52) U.S. Cl.
CPC ............. *H02J 3/18* (2013.01); *H02M 7/5395* (2013.01); *H02J 2300/20* (2020.01)

(58) Field of Classification Search
CPC . H02M 7/5395; H02J 3/16–22; H02J 2300/20
See application file for complete search history.

(56) References Cited

U.S. PATENT DOCUMENTS

| 10,439,507 B2 * | 10/2019 | Ramamurthy | H02M 7/12 |
| 10,715,056 B2 * | 7/2020 | Liu | H02M 1/08 |
| 2017/0149350 A1 * | 5/2017 | Ramamurthy | H02M 1/08 |
| 2017/0155247 A1 * | 6/2017 | Liu | H02J 3/18 |
| 2017/0229857 A1 | 8/2017 | Kral et al. | |
| 2017/0353101 A1 * | 12/2017 | Li | H02J 3/1864 |
| 2018/0269819 A1 | 9/2018 | Tuckey et al. | |
| 2019/0109461 A1 | 4/2019 | Khajehoddin et al. | |

(Continued)

FOREIGN PATENT DOCUMENTS

CN 104638891 A 5/2015

OTHER PUBLICATIONS

Julian, Alexander L. et al. "Elimination of Common-Mode Voltage in Three-Phase Sinusoidal Power Converters." IEEE Transactions On Power Electronics, vol. 14, No. 5, Sep. 5, 1999, pp. 982-989.

(Continued)

*Primary Examiner* — Fred E Finch, III
(74) *Attorney, Agent, or Firm* — Posz Law Group, PLC

(57) ABSTRACT

A power converter controller for virtual impedance realization is provided that comprises: a sampling circuit configured to sample a real grid interface voltage at terminals of the power converter; a first operation block, which may be a subtractor, for performing a first operation on a reference voltage signal and the sampled real grid interface voltage signal of the power converter to generate a first voltage signal; a second operation block that may consist of a divider for dividing the first voltage signal by an amplification factor to generate a second voltage signal; and third operation block, which may be an adder, for adding the sampled real grid interface voltage signal to the second voltage signal, and a third voltage signal to generate a command voltage signal for realization at the DC-to-AC voltage conversion output, wherein the amplification factor is a real number greater than or equal to 1.

27 Claims, 8 Drawing Sheets

(56) References Cited

U.S. PATENT DOCUMENTS

2019/0296643 A1\* 9/2019 Li .................... G06N 3/0445
2020/0052493 A1\* 2/2020 Kolhatkar ............... H02J 3/386

OTHER PUBLICATIONS

Zhang, Weiyi et al. "Grid-Connected Converters with Virtual Electromechanical Characteristics: Experimental Verification." Oct. 5, 2017.
He, Jinwei et al. "Coupled-Virtual-Impedance Control for AC/DC Hybrid Microgrid Power Electronic Interlinking Unit with Dual Converters." IEEE Transactions on Smart Grid, vol. 10, No. 3, Apr. 10, 2018.

\* cited by examiner

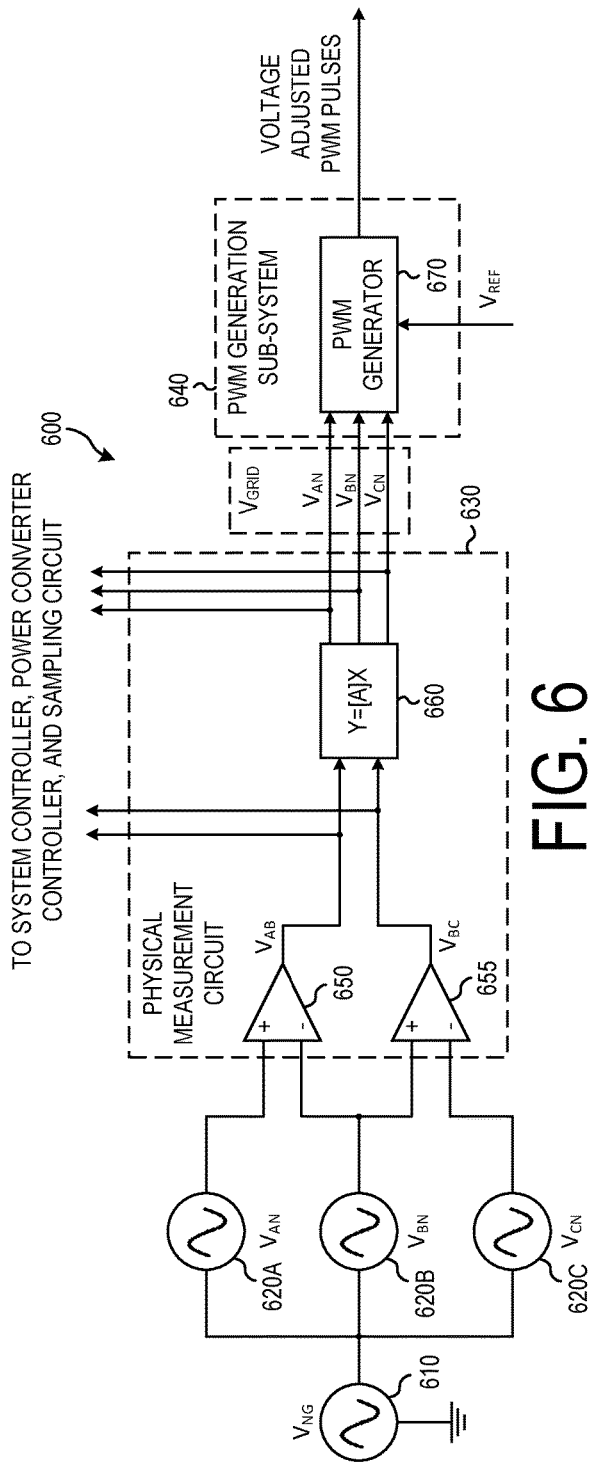
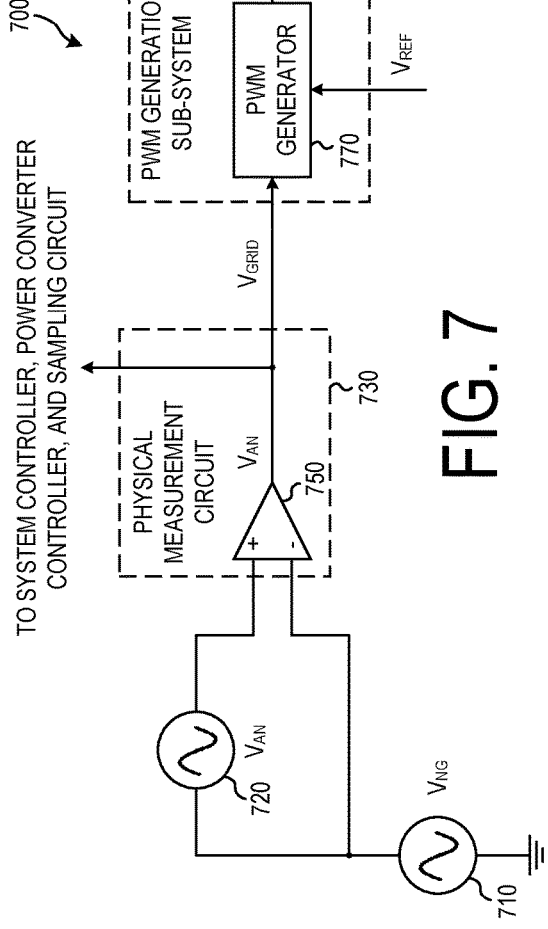
FIG. 6
FIG. 7

SYSTEM AND METHOD FOR POWER CONVERTER CONTROL FOR VIRTUAL IMPEDANCE

FIELD OF THE INVENTION

The disclosed system and method relate generally to a system and method for realizing a power converter based virtual impedance scheme in an electrical power system. More particularly, the disclosed system and method for using local voltage measurements to modify pulse width modulation commands in a power converter and realize a high-fidelity virtual impedance.

BACKGROUND OF THE INVENTION

A typical power supply system involves a bulk area electric power system (BEPS) with a large, central power generation source (e.g., a coal power plant, a natural gas power plant, a nuclear power plant, etc.) that supplies power to a power grid in a specific region. Power inverters in such a BEPS are generally grid-following inverters. These grid-following inverters track the voltage of the power grid and synchronize to that voltage to control their own output voltage and provide power. They cannot operate apart from the power grid. In other words, when the central power generation source fails, the grid-follower inverters cannot continue to provide power.

However, some power supply systems employ grid-forming power converters (GFPCs). These GFPCs are often connected to a grid at a location closer to a load than a central power generation source and participate actively in forming a grid voltage. In other words, the GFPCs can act as power sources should the rest of the grid cease to provide power. Some examples of such power systems with GFPCs are microgrids with photovoltaic power systems, wind power systems, and battery energy storage systems (BESSs). Although these GFPCs are also able to connect to an existing power grid in grid-following mode, they can continue to provide power to a targeted area when it has an energy source, e.g., an emergency power supply (EPS), even if the rest of the power grid goes down. In many cases, the GFPCs' energy source are renewable power sources, such as photovoltaic or wind power sources. These GFPCs are often on a 10-megawatt to 100-megawatt scale as opposed to a hundred-megawatt or thousand-megawatt scale for a BEPS, such as a coal or nuclear plant.

GFPCs are currently targeted to be used in applications in which a BEPS has the potential to be disconnected. In such a circumstance, local GFPCs are required to provide and maintain voltage and current to certain loads that require constant power, e.g., local EPS loads, while operating in parallel with other GFPC or conventional generators.

As renewable energy sources become a greater portion of the BEPS generation mix, issues relating to the connection of a GFPC to a power grid will become more important, even during normal operation of a BEPS. At such times, multiple GFPCs or plants containing them may operate in parallel in a location far away (relatively electrically de-coupled) from conventional generators. During such operation, these converters can become sensitive to grid and load transients due to their operating primarily as a voltage source. These GFPCs may become unsynchronized with other GFPCs connected to the grid causing stability issues.

As a result, these converters require a way to maintain stability and to decouple transients beyond the current limiting controls using the inherent grid side output filter found in all grid connected converters. De-coupling here is limited by the small size and impedance of this filter. It would therefore be desirable to control a perceived impedance of the inherent output filter using a virtual impedance realization system and method.

SUMMARY OF THE INVENTION

A power converter controller for virtual impedance realization is provided, comprising: a sampling circuit configured to sample a real grid interface voltage at the terminals of the power converter; a first operation block configured to perform a first operation on a reference voltage signal and the sampled real grid interface voltage signal of the power converter to generate a first voltage signal; a second operation block configured to perform a second operation on the first voltage signal to generate a second voltage signal; and a third operation block configured to perform a third operation on the sampled real grid interface voltage signal, the second voltage signal, and a third voltage signal to generate a command voltage signal for realization at the output of DC-to AC conversion in the converter.

The power converter controller may further comprise: a modulator configured to modulate the command voltage signal to generate a series of pulse width modulation (PWM) pulses.

In one implementation of this virtual impedance realization, the first operation block is a subtractor, the second operation block is an arithmetic divider by an amplification factor, the third operation block is an adder, and the third voltage signal is zero. The amplification factor may be a real number typically between 1 and 250, with the upper limit of the amplification factor being determined by implementation considerations such as attainable numerical resolution of samplers and circuits, as well as system factors such as desired ramp rates for system references during operations such as power system black start, motor start etc. In another implementation, the first operation block is an arithmetic divider by the amplification factor acting independently on the inputs and the second operation block is a subtractor. Some other possible implementations are also described later. But, a large variety of derived embodiments become possible based on the basic controller structure.

The power converter controller may further comprise: a reference voltage generator configured to generate the reference voltage signal based on a virtual impedance, a desired grid interface current, a desired grid interface voltage for a power converter, and a third voltage signal, wherein the virtual impedance is equal to a real impedance of the power converter filter multiplied by the amplification factor, and the third voltage signal has a value of zero.

The desired grid interface current may be either determined by a DC bus regulator or received from a system controller (system controller may be internal to the power converter or external).

The reference voltage generator may further comprise: a multiplier configured to multiply the real impedance of the power converter by the amplification factor to generate the virtual impedance; a voltage generator configured to generate a compensation voltage based on the virtual impedance and the desired grid interface current; and an adder configured to add the desired grid interface voltage for a power converter and the compensation voltage to generate the reference voltage signal.

The power converter controller may further comprise: a reference voltage generator configured to generate the reference voltage signal based on a desired grid interface voltage for a power converter, a third voltage signal having a value determined by the real impedance and a desired grid interface current.

The desired grid interface current is either determined by a DC bus regulator or received from received from a system controller (system controller may be internal to the power converter or external).

The third voltage generator may further comprise: a voltage generator configured to generate a compensation voltage based on the real impedance and the desired grid interface current to generate a third voltage signal.

The sampling circuit may further comprise: a physical measurement circuit configured to generate the real grid interface voltage signal of the power converter based on one or more voltages from the grid interface output of the power converter.

The physical measurement circuit may further comprise: an amplifier configured to subtract a measured common mode output voltage signal of the power converter from the measured voltage signals to generate the real grid interface voltage signal of the power converter.

The physical measurement circuit may further comprise: a first amplifier configured to subtract a second-phase grid interface output voltage of the power converter from a first-phase grid interface output voltage of the power converter to generate a first line-to-line voltage signal; a second amplifier configured to subtract a third-phase grid interface output voltage of the power converter from the second-phase grid interface output voltage of the power converter to generate a second line-to-line voltage signal; and a conversion circuit configured to generate the real grid interface voltage signal of the power converter as a three-phase voltage signal based on the first line-to-line voltage, the second line-to-line voltage, and a transfer function.

The transfer function may be Y=[A]X, and [A] may be $$\begin{bmatrix} 2/3 & 1/3 \\ -1/3 & 1/3 \\ -1/3 & -2/3 \end{bmatrix},$$

where X is the measured line-to-line voltage measurements and Y is the line-to-neutral voltage signals.

A power conversion system is provided, comprising: a power converter configured to convert a DC power voltage to an AC voltage based on a series of pulse width modulation (PWM) pulses; a power converter controller including a sampling circuit configured to sample an output voltage of the power converter to generate a real grid interface voltage signal for the power converter; a first operation block configured to perform a first operation on the real grid interface voltage of the power converter and a reference voltage to generate a first voltage signal; a second operation block configured to perform a second operation on the first voltage to generate a second voltage signal; a third operation block configured to perform a third operation on the real grid interface voltage signal, the second voltage signal, and a third voltage signal to generate a command voltage signal; and a modulator configured to modulate the command voltage signal to generate the series of PWM pulses.

In one implementation of this virtual impedance realization, the first operation block is a subtractor, the second operation block is an arithmetic divider by an amplification factor and the amplification factor may be a real number between 1 and 250, with the upper limit being typically determined by implementation considerations such as attainable numerical resolution of samplers and circuits as well as system factors such as desired ramp rates for system references, the third operation block is an adder and the third voltage signal is zero. In another implementation, the first operation block is an arithmetic divider by the amplification factor acting independently on the inputs and the second operation block is a subtractor, and the third operation block is an adder. Some other possible implementations are also described later. But, a large variety of derived embodiments become possible based on the basic controller structure. The power conversion system may further comprise: a reference voltage generator configured to generate the reference voltage signal based on a virtual impedance, a desired grid interface current, and a desired grid interface voltage for a power converter, wherein the virtual impedance is equal to a real impedance of the power converter multiplied by the amplification factor.

The desired grid interface current may be either determined by a DC bus regulator or received from a system controller (system controller may be internal to power converter or external).

The reference voltage generator may further comprise: a multiplier configured to multiply the real impedance of the power converter by the amplification factor to generate the virtual impedance; a voltage generator configured to generate a compensation voltage signal based on the virtual impedance and the desired grid interface current; and an adder configured to add the desired grid interface voltage for a power converter and the compensation voltage signal to generate the reference voltage signal.

The sampling circuit may further comprise: a physical measurement circuit configured to generate the real grid interface voltage signal of the power converter based on one or more voltages at the grid interface output of the power converter.

The physical measurement circuit may further comprise: an amplifier configured to subtract a common voltage from a single-phase grid interface output voltage of the power converter to generate the real grid interface voltage of the power converter.

The physical measurement circuit may further comprise: a first amplifier configured to subtract a second-phase grid interface output voltage of the power converter from a first-phase grid interface output voltage of the power converter to generate a first line-to-line voltage; a second amplifier configured to subtract a third-phase grid interface output voltage of the power converter from the second-phase grid interface output voltage of the power converter to generate a second line-to-line voltage; and a conversion circuit configured to generate the real grid interface voltage of the power converter as a three-phase voltage based on the first line-to-line voltage, the second line-to-line voltage, and a transfer function.

The transfer function may be Y=[A]X, and [A] may be $$\begin{bmatrix} 2/3 & 1/3 \\ -1/3 & 1/3 \\ -1/3 & -2/3 \end{bmatrix},$$

where X is the measured line-to-line voltage measurements and Y is the line-to-neutral voltage signals.

A method of realizing a virtual impedance is provided, comprising: multiplying a real impedance of a power converter by an amplification factor to generate a virtual impedance; determining a compensation voltage based on the virtual impedance and a desired grid interface current; determining a reference voltage based on the compensation voltage and a desired grid interface voltage of the power converter; performing a first operation on the reference voltage and a real grid interface voltage of the power converter to generate a first voltage; performing a second operation on the first voltage to generate a second voltage; performing a third operation on the real grid interface voltage, the second voltage and a third voltage to generate a command voltage; and performing a DC-to-AC conversion to convert a source DC voltage to the voltage at the output of DC-to-AC conversion based on the command voltage.

The operation of performing the DC-to-AC conversion to convert the source DC voltage to the converter output voltage based on the command voltage may further comprise: modulating the command voltage to generate a series of pulse width modulation (PWM) pulses; and performing the DC-to-AC conversion to convert the source DC voltage to the converter output voltage at the output of DC-to-AC conversion based on the PWM pulses.

The PWM pulses may set the duty cycle of the output of the DC-to-AC voltage conversion.

In one implementation of this virtual impedance realization, the first operation is a subtraction operation and the second operation is a dividing by an amplification factor operation with the amplification factor being a real number between 1 and 250, with the upper limit being determined by implementation considerations such as numerical resolution of samplers and circuits as well as system factors such as desired ramp rates for system references and the third operation is an addition operation, with the third voltage equal to zero.

The desired grid interface current may be either determined by a DC bus regulator or received from a system controller (system controller may be internal to power converter or external).

The reference voltage may be determined by adding the compensation voltage to the desired grid interface voltage of the power converter.

The real grid interface voltage of the power converter may be a sampled voltage at the grid interface terminals of the power converter.

The method may further comprise: determining the real grid interface voltage of the power converter based on one or more line-to-line voltages from an output of the power converter.

The determining of the real grid interface voltage may be performed by subtracting a common voltage from a single-phase grid interface output voltage of the power converter to generate the real grid interface voltage of the power converter.

The determining of the real grid interface voltage may be performed by subtracting a second-phase grid interface output voltage of the power converter from a first-phase grid interface output voltage of the power converter to generate a first line-to-line voltage; subtracting a third-phase grid interface output voltage of the power converter from the second-phase grid interface output voltage of the power converter to generate a second line-to-line voltage; and generating the real grid interface voltage of the power converter as a three-phase voltage based on the first line-to-line voltage, the second line-to-line voltage, and a transfer function.

The transfer function may be $Y=[A]X$, and $[A]$ may be $$\begin{bmatrix} 2/3 & 1/3 \\ -1/3 & 1/3 \\ -1/3 & -2/3 \end{bmatrix},$$

where X is the measured line-to-line voltage measurements and Y is the line-to-neutral voltage signals.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present disclosure.

FIG. 6 is a circuit diagram of a voltage measurement circuit for a three-phase power system according to disclosed embodiments;

FIG. 7 is a circuit diagram of a voltage measurement circuit for a one-phase power system according to disclosed embodiments;

DETAILED DESCRIPTION

Figure 1:
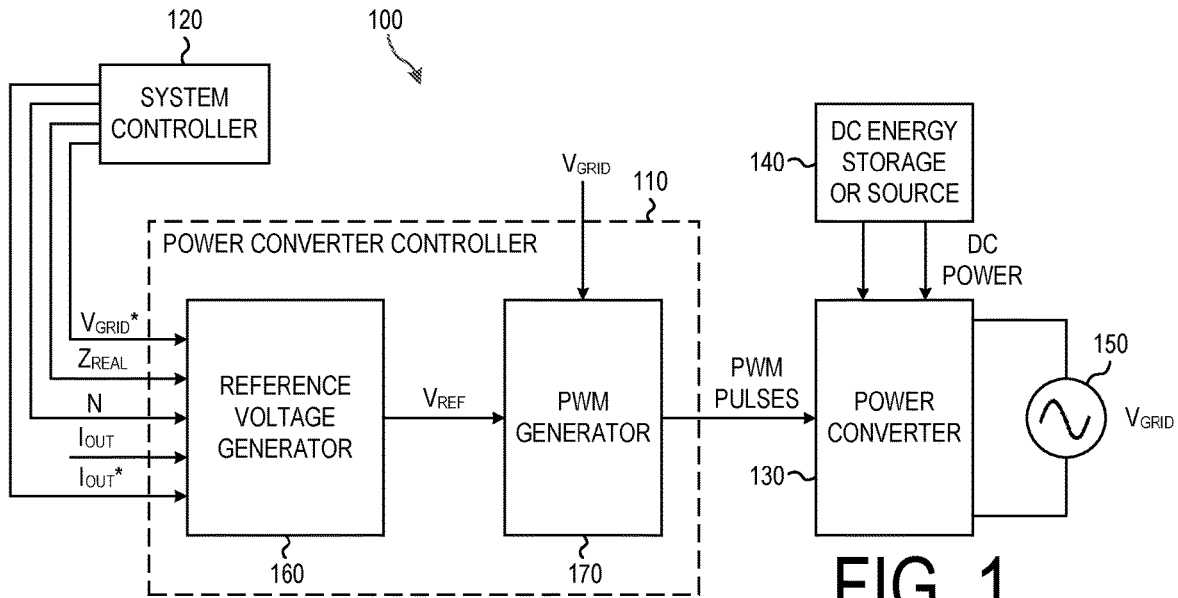
FIG. 1 is a block diagram of a virtual impedance realization system and related devices according to disclosed embodiments.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

This disclosure will refer to power converters and power inverters. Power converters and power inverters are both electrical devices that convert voltage and current. Power converters are electrical devices that convert the voltage and current, usually alternating current (AC) to direct current (DC) and vice-versa. In contrast, power inverters traditionally convert direct current (DC) to alternating current (AC). However, especially with motor applications, the device involved may be commonly called a power inverter and may include one or more converters/inverters each having the PWM generation scheme described herein, but typically performs like a power converter supporting motoring as well as braking operations. The concepts described below apply equally to power converters and power inverters and their applications.

Virtual Impedance Realization

In various systems, impedance realization in a power converter system can be accomplished using physical impedance realization or virtual impedance realization.

Physical impedance realization is achieved by installing physical components that correspond to the value of impedance desired in a system. As the required impedance value increases, the size, cost, and losses also increase. The command voltage in the converter controller is modified to enable circulation of the desired grid interface current considering this impedance value. However, the higher value of impedance also increases the values of voltages in the physical power converter, making certain values of impedance unrealizable in the system close to and beyond the point where the converter voltage limits are reached.

On the other hand, virtual impedance realization can be effectively implemented at a converter modulator by simply modifying a computation of a voltage command generated by the converter controller. However, the exact point of implementation may depend on the individual controller architecture of alternate embodiments. Such a virtual impedance realization system and method acts to amplify both the resistive and inductive elements of an output filter at the modulator level with minimal lag using a phase-voltage method feedback to measure and control a virtual voltage drop across the output filter. This virtual impedance system and method can be coupled with a voltage measurement circuit designed to calculate phase-to-neutral voltages while only measuring line-to-line voltages.

This system and method of virtual impedance realization removes a common mode voltage seen at the grid interface terminals of a conventional converter system and measures the phase-to-neutral grid interface terminal voltage of the converter. This phase-to-neutral voltage measurement is provided directly to a local gate-drive modulator to provide instantaneous voltage feedback that realizes minimal lag compared to virtual impedance at a system control module. This system and method can be applied to both-phase single and three-phase power converters and can minimize disturbances caused by harmonics, fundamental and non-fundamental frequency components.

Aspects of this design include: the realization of virtual impedance at a modulator using operations at the power converter controller and its PWM Generator based on a grid interface output voltage measurement; the use of a voltage measurement circuit to measure line-to-line voltages and reject three-phase common-mode voltages directly to the PWM Generator; and the combined usage of measuring line-to-line voltages and providing these voltages directly into the PWM generator to modify commands to the modulator to implement a virtual impedance.

The disclosed system and method can be applied to multiple applications. Examples of these applications include: grid forming power converters (GFPCs) for a photovoltaic (PV) power system, a wind power system, or a battery energy storage system (BESS); uninterrupted power supply (UPS) systems; motor drives; static synchronous compensators (STATCOMs); and active filters.

The virtual impedance realization modulator described below is a control structure using hardware in a voltage measurement circuit, as well as local analog-to-digital (A/D) integrated circuits (ICs) that are selected to have minimal delays and active filters.

Because of the power flow dependency laws that are well-known to power engineers, the target virtual impedance is dominantly an inductor. Also, a virtual inductance has an increased impedance at higher frequencies. Hence, amplifying the pre-dominantly inductive power converter filter is advantageous towards reducing the dependence of the system controller stability and tracking performance on the system parameters and simplifying the system controller implementation.

Virtual Impedance Realization System—First Disclosed Embodiment

FIG. 1 is a block diagram of a virtual impedance realization system 100 and related devices according to disclosed embodiments. As shown in FIG. 1, the virtual impedance realization system 100 includes a power converter controller 110 and a system controller 120. The power converter controller 110 is connected to a power converter 130 that may receive DC power from a DC energy storage or source 140 and provides power to a grid interface 150. The power converter controller 110 includes a reference voltage generator 160 and a pulse width modulation (PWM) generator 170.

The power converter controller 110 is a circuit that operates to generate pulse width modulation (PWM) pulses that are provided to control the DC-to-AC conversion output $V_{CONV}$ of the power converter 130. The power converter controller 110 generates the PWM pulses based on information fed back to it regarding one or more of an actual grid voltage $V_{GRID}$ for the grid interface 150, a desired grid voltage $V_{GRID}^*$ for the grid interface 150, an actual grid interface current $I_{OUT}$ from the power converter 130, a desired grid interface current $I_{OUT}^*$ from the power converter 130, an amplification factor N and a real output impedance $Z_{REAL}$ of the power converter 130. In some embodiments, the sampled actual current at the output of DC-to-AC conversion or at an intermediate point in the filter path may be used directly as or corrected to yield the actual grid interface current $I_{OUT}$.

$V_{GRID}$ is an actual, sampled value of a grid voltage at the power converter 130 output; $V_{GRID}^*$ is a desired value for the grid interface voltage output by the power converter 130; $I_{OUT}$ is an actual, sampled value of the grid interface current of the power converter 130; $I_{OUT}^*$ is a desired value of the grid interface current of the power converter 130; N is an amplification factor; and $Z_{REAL}$ is an actual impedance of the power converter 130.

The system controller 120 operates to control at least the power converter controller 110. In various embodiments it can provide the power converter controller 110 with values for the converter impedance $Z_{REAL}$, the desired grid voltage $V_{GRID}^*$, the amplification factor N, and the desired current $I_{OUT}^*$. In various embodiments the system controller can be a microcomputer or other microcontroller, an ASIC, industrial PC, PLC, or any suitable control circuit. Although not shown, the system controller 120 may include an integrated or separate dynamic or static memory element, such as a RAM or a ROM.

The power converter 130 may receive DC power from the DC energy storage or source 140 and convert that DC power into AC power usable on a grid by the grid interface 150. Because it operates to convert DC power to AC power, the power converter 130 could also be referred to as a power inverter. For ease of disclosure element 130 will be referred to as a power converter. However, this should not limit this element 130 in any way, and it should also be considered to support element 130 being a power inverter.

The power converter 130 may operate without DC power from the DC energy storage or source 140; in this case, it sustains the DC bus voltage of an integrated capacitor using power from the grid and injects AC currents to supply reactive power and harmonic currents to the grid interface 150. Because it operates to convert DC to AC, the power converter 130 could also be referred to as a power inverter.

The power converter 130 is a PWM power converter. In other words, in addition to having an internal DC voltage that may be supported by DC power from the DC energy storage or source 140, it also receives a set of PWM pulses from the power converter controller 110. The power converter 130 uses these PWM pulses to adjust its DC-to-AC AC voltage $V_{CONV}$ to give an output voltage determined by the command voltage, irrespective of characteristics of the grid interface 150.

The power converter 130 in this embodiment is a grid-forming power inverter. In other words, the power converter 130 can act as a voltage source by converting the DC voltage from the DC energy storage or source 140 or internal dc bus and providing it as AC power or currents to the grid interface 150.

The PWM pulses generated by the PWM generator 170 can be adjusted based in part on feedback regarding the actual physical impedance of the power converter 130. One way to achieve this feedback control is to use the actual physical impedance $Z_{REAL}$ of the power converter 130; another way is to use a virtual impedance $Z_V$ that is based on the actual impedance $Z_{REAL}$ but is not identical to the $Z_{REAL}$. Using a virtual output inductance $Z_V$ allows for less complicated control of the power converter controller 110 and greatly enhanced de-coupling between the output of the power converter 130 and the grid interface.

The DC energy storage or source 140 represents a power source that may support a grid-forming power converter (GFPC) that provides power to a grid in the form of a grid voltage $V_{GRID}$. More particularly, the DC energy storage or source 140 is a storage element or a power source that may provide DC power to the power converter. For example, in various embodiments it could be a photovoltaic (PV) power generator, a wind power generator, a battery energy storage system (BESS), an uninterrupted power supply (UPS) system, or any other suitable DC power supply.

The grid interface 150 may simply be a load, motor or a connection point where the power converter 130 is connected on a complex power grid formed by multiple GFPCs, loads, conventional central generation sources and grid following inverters or converters, this connection point is generally referred to as the point of common coupling (PCC) or point of coupling (POC). The grid interface will have an associated grid voltage $V_{GRID}$ that represents a voltage provided at the grid interface terminals of the power converter 130 and hence, this voltage is determined by power converter 130 as well as all other entities forming the grid.

The reference voltage generator 160 is an electrical circuit that generates a reference voltage $V_{REF}$ based on one or more of the actual grid voltage $V_{GRID}$, the desired grid voltage $V_{GRID}^*$, the actual grid interface current $I_{OUT}$, the desired grid interface current $I_{OUT}^*$, the amplification factor N and the real output impedance $Z_{REAL}$. The reference voltage $V_{REF}$ is generated such that it will instruct the PWM generator 170 to produce PWM pulses that produce an output $V_{CONV}$ that results in the desired grid interface voltage $V_{GRID}^*$ and the desired grid interface current $I_{OUT}^*$. The desired grid interface voltage $V_{GRID}^*$ and the desired grid interface current $I_{OUT}^*$ are set to achieve desired performance characteristics with respect to the grid load 150 and may be varied with time in some embodiments.

In the embodiment of FIG. 1, the reference voltage generator 160 receives the desired grid voltage $V_{GRID}^*$, the desired grid interface current $I_{OUT}^*$, the amplification factor N, and the real output impedance $Z_{REAL}$ from the system controller 120 and receives the actual grid interface voltage $V_{GRID}$ and the actual grid interface current $I_{OUT}$ from respective voltage and current measurements circuits (not shown in FIG. 1). However, in alternate embodiments the reference voltage generator 160 can receive these various inputs in different ways. For example, in some alternate embodiments the amplification factor N can be stored in a memory that is external or internal to the reference voltage generator 160 and read from that memory by the reference voltage generator 160.

Furthermore, although FIG. 1 discloses that the reference voltage generator 160 receives all of the actual grid voltage $V_{GRID}$, the desired grid voltage $V_{GRID}^*$, the actual output current $I_{OUT}$, the desired grid interface current $I_{OUT}^*$, the amplification factor N and the real output impedance $Z_{REAL}$, alternate embodiments can have the reference voltage generator 160 receive more or fewer signals to use in generating the reference voltage $V_{REF}$. For example, due to the dominantly inductive value of the virtual impedance, the reference voltage generator could calculate the reference voltage signal simply based on well-known power-flow dependency laws known to power engineers that are commonly used for synchronous generator control and associated power flow studies as in a conventional power system, namely: $P_{GRID}^* = V_{GRID}^* V_{REF}/X_v^* \sin(\delta)$, $Q_{GRID}^* = (V_{REF} - V_{GRID}^*) V_{GRID}^* X_v^* \cos(\delta)$ or $Q_v^* = (V_{REF} - V_{GRID}^*) V_{REF}/X_v^* \cos(\delta)$, where $V_{GRID}^*$ is the desired grid interface rms voltage magnitude, $V_{REF}$ is the rms magnitude of the reference voltage generator signal to be used as command voltage to the modulator with the third voltage signal=0, $P_{GRID}^*$ is the desired active power at the terminals of the power converter, $Q_{GRID}^*$ is the desired reactive power at the terminals of the power converter, $Q_v^*$ is the virtual reactive power inside the controller to attain $Q_{GRID}^*$ at the terminals, and $X_v$ is the reactance component of the virtual impedance, and $\delta$ is the phase angle between the internal $V_{REF}$ and $V_{GRID}^*$. The magnitude of $V_{REF}$ may be much >1.0 p.u. depending on the value of $X_V$. In this case, $I_{OUT}$ and $I_{OUT}*$ are not used in $V_{REF}$ calculation.

The PWM generator 170 receives the reference voltage $V_{REF}$ from the reference voltage generator 160 and uses the reference voltage $V_{REF}$ to generate the PWM pulses used by the power converter 130 to generate a grid voltage at its output.

By adjusting the PWM pulses provided by the PWM generator 170 to the power converter 130, the virtual impedance realization system 100 can alter the power provided by the power converter 130 such that it appears to have a different output impedance to the system controller 120 as well as the grid interface 150. In other words, by manipulating the PWM pulses the virtual impedance realization system 100 can virtually change the effective impedance of the power converter 120, as seen by the system controller 120 as well as the grid interface 150.

Figure 2:
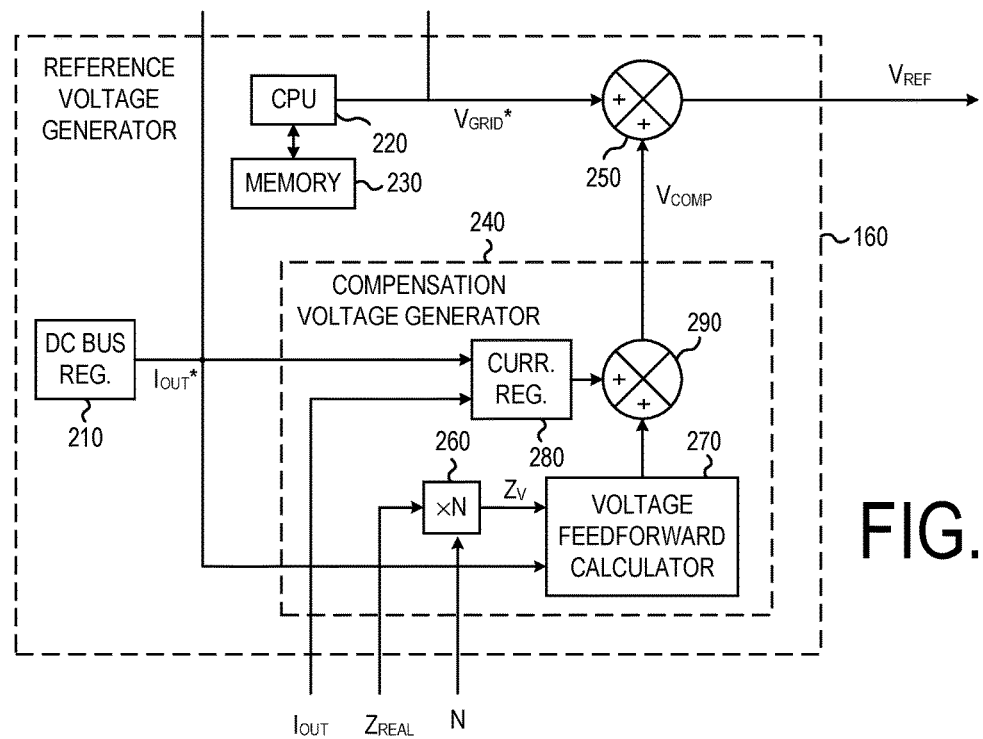
FIG. 2 is a block diagram of a reference voltage generator of the virtual impedance realization system of FIG. 1 according to disclosed embodiments.

FIG. 2 is a block diagram of a reference voltage generator 160 of the virtual impedance realization system 100 of FIG. 1 according to disclosed embodiments.

As shown in FIG. 2, the reference voltage generator 160 includes a DC bus regulator 210, a CPU 220, a memory 230, a compensation voltage generator 240, and a first adder 250. The compensation voltage generator includes a multiplier 260, a voltage feedforward calculator 270, a current regulator 280, and a second adder 290.

The DC bus regulator 210 operates to regulate the DC bus voltage of the power converter 130. In addition to its other functions it can provide a value for the desired grid interface current $I_{OUT}*$ to the compensation voltage generator 240. However, this is by way of example only. Alternate embodiments can provide the value for the desired grid interface current $I_{OUT}*$ in different ways. For example, in one alternate embodiment the value for the desired grid interface current $I_{OUT}*$ can be provided directly from the system controller 120. In such an embodiment, the DC bus regulator 210 may be omitted, or at least the function of the DC bus regulator 210 providing the value for the desired grid interface current $I_{OUT}*$ to the compensation voltage generator 240 may be removed.

The CPU 220 operates as a controller to control certain operations within the reference voltage generator 160. In some embodiments it can provide the desired grid voltage $V_{GRID}*$ to the first adder 250. For example, a value for the desired grid voltage $V_{GRID}*$ could be retrieved from the memory 230 or a memory within the CPU 220, or it could be calculated in the CPU 220 based on other information retrieved from the memory 230 or a memory within the CPU 220. In various embodiments the CPU 220 can be a microcomputer, a microcontroller, an ASIC, or the like.

The memory 230 is a dynamic or static memory such as a RAM or a ROM that is used to hold data or programs used by the CPU 220. In some embodiments it can store either a value for the desired grid voltage $V_{GRID}*$ and the amplification factor N or information necessary to calculate a value for the desired grid voltage $V_{GRID}*$ and the amplification factor N.

The compensation voltage generator 240 operates to generate a compensation voltage $V_{COMP}$ that is added to the desired grid voltage $V_{GRID}*$ to generate the reference voltage $V_{REF}$. In the embodiment of FIG. 2, the compensation voltage generator 240 receives information regarding the actual grid interface current $I_{OUT}$ of the power converter 130, the desired grid interface current $I_{OUT}*$ of the power converter 130, the amplification factor N and the actual output impedance $Z_{REAL}$ of the power converter 130 and uses this information to generate the compensation voltage Vamp. However, this is by way of example only. In alternate embodiments, the compensation voltage generator 240 can use different input values to generate the compensation voltage $V_{COMP}$.

The first adder 250 receives the desired grid voltage $V_{GRID}*$ from a suitable source, such as the CPU 220 or the system controller 120, and an impedance compensation voltage $V_{COMP}$ from the compensation voltage generator 240. The first adder 250 operates to add these two values together to get the reference voltage $V_{REF}$, which is provided to the PWM generator 170.

The multiplier 260 receives a value for the actual output impedance $Z_{REAL}$ from a suitable source, such as the system controller 120, and multiplies the actual impedance value $Z_{REAL}$ by a value N to generate a virtual impedance $Z_V$ (i.e., $Z_V = N \times Z_{REAL}$). The value N is a positive real number. In the embodiment of FIGS. 1-4 N can vary from 1 to 250. However, this is by way of example only. In alternate embodiments N can be lower than 1 or higher than 250.

The output of the multiplier 260 is a virtual impedance $Z_V$ that is the value of the real impedance $Z_{REAL}$ multiplied by N. By manipulating the value of N, the virtual impedance realization system 100 can vary the virtual impedance $Z_V$ ultimately used to control operation of the power converter.

In some embodiments the value of N can be varied, e.g., by the system controller 120, to allow the virtual impedance realization system 100 to vary the value of the virtual impedance $Z_V$.

The voltage feedforward calculator 270 receives the virtual impedance $Z_V$ from the multiplier 260 and the desired grid interface current $I_{OUT}*$ from a suitable source, e.g., the system controller 120. It then uses these two values to generate a first intermediate voltage that is sent to the second adder 290. In one embodiment the virtual impedance $Z_V$ is multiplied by the desired grid interface current $I_{OUT}*$ to generate the first intermediate voltage.

The current regulator 280 receives the actual output current $I_{OUT}$ and the desired grid interface current $I_{OUT}*$ from a suitable source and uses these two values to generate a second intermediate voltage that is sent to the second adder 290. For example, in one embodiment the desired grid interface current $I_{OUT}*$ can be received from the system controller 120; in another embodiment the desired grid interface current $I_{OUT}*$ can be received from the DC bus regulator 210. In operation, the current regulator 280 compares the value of the actual grid interface current $I_{OUT}$ with the value of the desired grid interface current $I_{OUT}*$ and uses this comparison to generate the second intermediate voltage.

In alternate embodiments the value of the desired grid interface current $I_{OUT}*$ provided to the voltage generator 270 and/or the current regulator 280 can be replaced with a selected current value that may be unrelated to the actual grid interface current $I_{OUT}$ but that is selected to generate a desired value for the impedance compensation voltage Vamp.

The second adder 290 receives the first intermediate voltage from the voltage feedforward calculator 270 and the second intermediate voltage from the current regulator 280 and adds these two intermediate voltages together to form the compensation voltage $V_{COMP}$, which is provided to the first adder 250.

However, this is by way of example only. Alternate embodiments could omit the first intermediate voltage or the second intermediate voltage from the calculation of the compensation voltage $V_{COMP}$. For example, one alternate embodiment could omit the current regulator 280 and have the voltage feedforward calculator 270 provide the first intermediate voltage directly as the compensation voltage $V_{COMP}$. Similarly, another alternate embodiment could omit the voltage feedforward calculator 270 and have the current regulator 280 provide the second intermediate voltage directly as the compensation voltage $V_{COMP}$. In such embodiments, the adder 290 can also be omitted since there would not be two intermediate voltages to add.

Alternate embodiments could employ still other ways of generating the compensation voltage $V_{COMP}$. For example, it is also possible in some embodiments to provide the compensation voltage $V_{COMP}$ directly from an external source, e.g., from the system controller 150, without using the voltage generator 270, the current regulator 280, or the adder 290. In such an embodiment, the value for the compensation voltage $V_{COMP}$ will be selected to achieve a desired reference voltage $V_{REF}$ as if a different virtual impedance $Z_V$ had been used.

Figure 3:
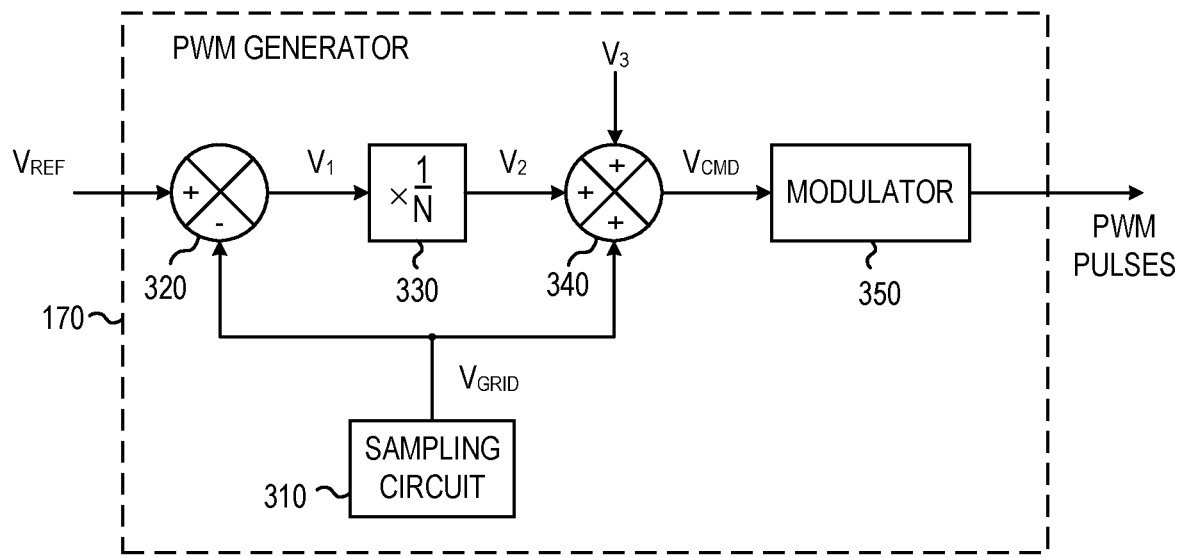
FIG. 3 is a block diagram of a pulse width modulation (PWM) generator of the virtual impedance realization system of FIG. 1 according to disclosed embodiments.

FIG. 3 is a block diagram of a pulse width modulation (PWM) generator 170 of the virtual impedance realization system 100 of FIG. 1 according to disclosed embodiments. As shown in FIG. 3, the PWM generator 170 includes a sampling circuit 310, a subtractor 320, a divider 330, a third adder 340, and a modulator 350. In more general terms, the subtractor 320 forms a first operation block, the divider 330 forms a second operation block, and the third added 340 forms a third operation block.

The sampling circuit 310 receives the grid interface voltage $V_{GRID}$ from a measuring circuit, samples it, and sends the sampled grid voltage $V_{GRID}$ to the subtractor 320 and the third adder 340. In doing so, the sampling circuit 310 may add an inherent delay in the grid voltage $V_{GRID}$ applied to the subtractor 320 and the adder 340. In some implementations, the first operation block may hence include a compensator on the sampled voltage to compensate for these delays before subtractor 320.

The subtractor 320 receives the reference voltage $V_{REF}$ from the reference voltage generator 160 and the grid voltage $V_{GRID}$ from the sampling circuit 310 and subtracts the grid voltage $V_{GRID}$ from the reference voltage $V_{REF}$ to obtain a first voltage $V_1$.

The divider 330 receives the first voltage $V_1$ and divides the first voltage by N to generate a second voltage $V_2$. The value of N in the divider 330 is the same value of N used in the multiplier 260 to generate the virtual impedance $Z_V$. In some implementations, the second operation block may include a transfer function implementation after the divider 330 to implement a change of behavior of the virtual impedance. In other words, a transfer function implementation may be added between the divider 330 and the third adder 340.

The third adder 340 receives the second voltage $V_2$ and the grid voltage $V_{GRID}$ from the sampling circuit 310 and adds the grid voltage to the second voltage $V_2$ to generate a command voltage $V_{CMD}$. The third adder 340 may also receive a third voltage $V_3$ such that it adds both the grid voltage $V_{GRID}$ and the third voltage $V_3$ to the second voltage to generate the command voltage $V_{CMD}$. If such a third voltage $V_3$ is received, it will be zero in this embodiment. However, alternate embodiments can use a different value for $V_3$. In some embodiments the third adder 340 could only add grid voltage $V_{GRID}$ and the second voltage $V_2$. In such an embodiment a fourth adder can be provided immediately after the third adder 340 to add the output voltage of the third adder 340 to the third voltage $V_3$ to obtain the command voltage $V_{CMD}$.

The modulator 350 receives the command voltage $V_{CMD}$ and compares it to a carrier wave. The modulator 350 then uses the command voltage signal $V_{CMD}$ as a reference signal to generate the PWM pulses that are provided to the power converter 130 The modulator may be implemented using any of the standard techniques such as sine-triangle or space vector for 2-level, multi-level, cascaded bridge topologies and may include compensation for bridge switch voltage drops and programmed dead-time to increase the accuracy of the realized command voltage. Alternate embodiments could consider compensation for differences of the measured actual pulse widths/timing with respect to the commanded widths/timing as well as compensation for differences between the measured actual voltage at $V_{CONV}$ and the command voltage.

Figure 4:
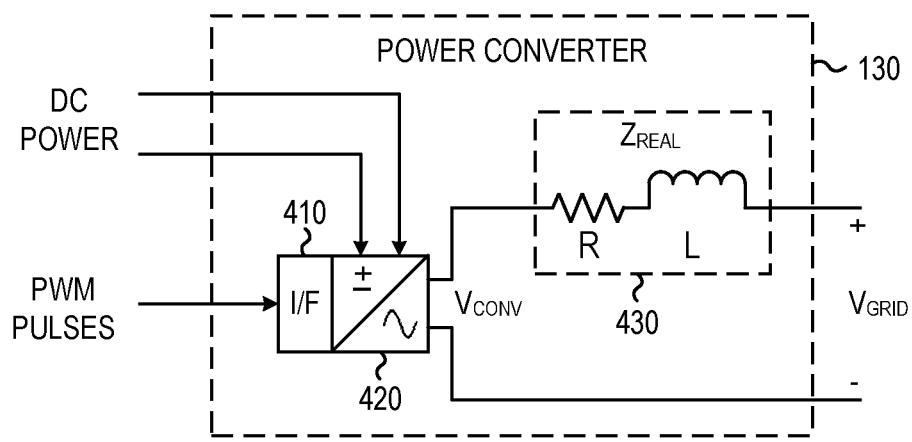
FIG. 4 is a block diagram of a power converter connected to the virtual impedance realization system where $Z_{REAL}$ is the equivalent impedance of the converter's physical internal filter impedance of FIG. 1 according to disclosed embodiments.

FIG. 4 is a block diagram of a power converter 130 connected to the virtual impedance realization system 100 of FIG. 1 according to disclosed embodiments. As shown in FIG. 4, the power converter includes interface circuitry 410, a DC-AC voltage converter 420, and an output filter 430. The output filter 430 includes an output resistance R and an output inductance L.

The interface circuitry 410 includes any circuitry necessary to adapt the PWM pulses received from the PWM generator 170 into a form that can control the DC-AC voltage converter 420. The interface circuitry 410 may involve translation of the control logic voltage level signals into driving signals of adequate voltage, current and energy to control the semi-conductor power switches in the converter 420, such as Gate Drive. The interface circuitry 410 may also include correction circuits for pulse width correction for errors in pulse widths/timing, output voltage error, dead time compensation. The interface circuitry 410 is connected to the DC-AC voltage converter 420 and receives the PWM pulses from the PWM generator 170. It uses the PWM pulses to control operation of the DC-AC voltage converter 420.

The DC-AC voltage converter 420 may receive DC power from the DC energy storage or source 140 and converts this DC power into AC power that is provided to the grid interface 150 through the output filter 430. The DC-AC voltage converter 420 performs this voltage conversion based on control signals from the interface circuitry 410 and generates a converter voltage $V_{CONV}$ at its output. Because the DC-AC voltage converter 420 converts DC power to AC power, it can also be referred to as a power inverter.

The output filter 430 is provided at the output of the DC-AC voltage converter 420 and filters the converter voltage $V_{CONV}$ to generate the grid voltage $V_{GRID}$ at the grid interface of the power converter 130. The output filter 430 has a real output impedance $Z_{REAL}$ that represents an impedance value of the output filter 430 that is made up of the equivalent filter resistance R and the equivalent filter inductance L. The output filter may have different actual topologies including but not limited to an inductor (L), an inductor-capacitor (L-C) and inductor-capacitor-inductor (L-C-L), and any L could be the leakage inductance of a transformer in the converter output. Since the real output impedance $Z_{REAL}$ represents the actual equivalent impedance of the output filter 430 at the output of the power converter 420, it is essentially the impedance seen at the output of the power converter 130.

Although FIG. 4 shows the output resistance R and the output inductance L within the output filter 430 as a resistance and inductance in series with each other, this is representational only. The output resistance R and the output inductance L represent that the output filter 430 has an equivalent resistance and an inductance. The exact selection and placement of resistive and inductive elements in the output filter can vary in different embodiments. The output resistance R represents the resistance value of all the resistive elements that make up the output filter 430, while the output inductance L represents the inductance value of all the inductive elements that make up the output filter 430. The capacitor in the physical filter gets typically eliminated when determining the equivalent R and L for the frequencies of interest for the virtual impedance and hence, is not shown in the figures for the virtual impedance scheme.

Virtual Impedance Realization System—Second Disclosed Embodiment

The embodiments of FIGS. 1-4 disclose a circuit in which a compensation voltage $V_{COMP}$ is added to the desired grid interface voltage $V_{GRID}*$ to generate the reference voltage $V_{REF}$ prior to the reference voltage $V_{REF}$ being provided to the subtractor 320, the divider 330, and the adder 340. However, this is by way of example only. Alternate embodiments can move where in the signal processing the compensation voltage Vamp is added. For example, an alternate embodiment can use the desired grid voltage $V_{GRID}*$ directly as the reference voltage $V_{REF}$ and add the compensation voltage $V_{COMP}$ to the output of the adder 340, to generate the command voltage $V_{CMD}$.

Figure 5:
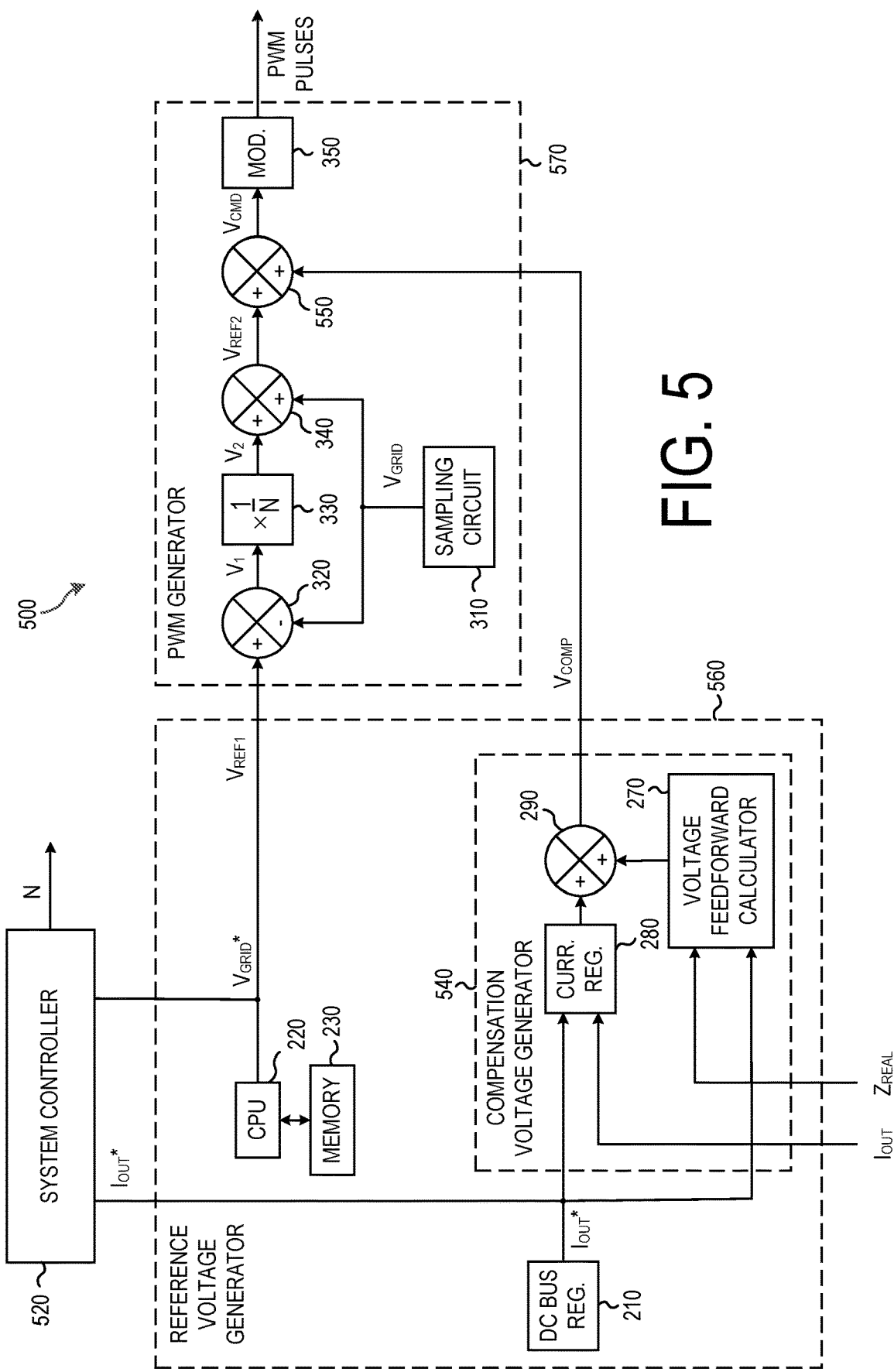
FIG. 5 is a block diagram of a virtual impedance realization system according to alternate disclosed embodiments.

FIG. 5 is a block diagram of a virtual impedance realization system 500 according to alternate disclosed embodiments. As shown in FIG. 5, the virtual impedance realization system 500 includes a system controller 560, a reference voltage generator 560 and a PWM generator 570. The reference voltage generator 560 includes a DC bus regulator 210, a CPU 220, a memory 230, and a compensation voltage generator 540. The compensation voltage generator 540 includes a voltage feed-forward generator 270, a current regulator 280, and a first adder 290. The PWM generator 570 includes a second adder 340, a subtractor 320, a divider 330, a third adder 550, and a modulator 350.

The DC bus regulator 210, CPU 220, memory 230, voltage generator 270, current regulator 280, first adder 290, subtractor 320, divider 330, third adder 340, and modulator 350 all operate as described above with respect to FIG. 1-4. As a result, their description will not be repeated.

The system controller 520 operates to control at least the reference voltage generator 560. In various embodiments it can provide the reference voltage generator 560 with values for the converter impedance $Z_{REAL}$, the desired grid voltage $V_{GRID}*$, the amplification factor N, and the desired current $I_{OUT}*$. In various embodiments the system controller can be a microcomputer or other microcontroller, an ASIC, industrial PC, PLC, or any suitable control circuit. Although not shown, the system controller 520 may include an integrated or separate dynamic or static memory element, such as a RAM or a ROM.

The compensation voltage generator 540 operates to generate a compensation voltage $V_{COMP}$ that is provided to the PWM generator 570. In the embodiment of FIG. 5, the compensation voltage generator 540 receives information regarding the actual grid interface current $I_{OUT}$ of the power converter 130, the desired grid interface current $I_{OUT}*$ of the power converter 130, and the actual output impedance $Z_{REAL}$ of the power converter 130 and uses this information to generate the compensation voltage Vamp. However, this is by way of example only. In alternate embodiments, the compensation voltage generator 240 can use different input values to generate the compensation voltage $V_{COMP}$.

In the reference voltage generator 560 of the virtual impedance realization system 500 of FIG. 5, the desired grid voltage $V_{GRID}*$ is provided to the PWM generator 570 unchanged as a reference voltage. However, to avoid confusion, this reference voltage is referred to in this embodiment as a first reference voltage $V_{REF1}$. The compensation voltage $V_{COMP}$ is provided separately to the PWM generator 570.

In the PWM generator 570, the subtractor 320 operates to subtract the sampled grid voltage $V_{GRID}$ from the first reference voltage $V_{REF1}$ to generate a first voltage $V_1$ in the same way that the subtractor 320 in the PWM generator 170 of FIGS. 1 and 3 operates to subtract the sampled grid voltage $V_{GRID}$ from the reference voltage $V_{REF}$ to generate the first voltage $V_1$.

Likewise, the third adder 340 operates to add the sampled grid voltage $V_{GRID}$ from the second voltage $V_2$ to generate a second reference voltage $V_{REF2}$ in the same way that the subtractor 320 in the PWM generator 170 of FIGS. 1 and 3 operates to add the sampled grid voltage $V_{GRID}$ to the second voltage $V_2$ to generate the command voltage $V_{CMD}$.

In contrast to the PWM generator 170 of FIGS. 1 and 3, the third adder 340 generates the second reference voltage $V_{REF2}$, which is then added at the second adder 550 to the compensation voltage $V_{COMP}$ received from the reference voltage generator 560 to generate the command voltage $V_{CMD}$.

As shown in FIG. 5, the second adder 550 for adding the compensation voltage $V_{COMP}$ into the processing that converts the desired grid voltage $V_{GRID}*$ to the command voltage $V_{CMD}$ is performed after the divider 330 divides the processed signal by N rather than before the divider 330 divides the process signal by N. Hence, $Z_{REAL}$ is not multiplied by N for the compensation voltage computation.

In the embodiment of FIG. 5, the compensation voltage $V_{COMP}$ corresponds to the third voltage $V_3$ in FIG. 3. In alternate embodiments the second adder 550 and third adder 340 could be replaced with a single three-input adder that added the second voltage $V_2$, the grid voltage $V_{GRID}$, and the compensation voltage $V_{COMP}$ to generate the commend voltage $V_{CMD}$.

As shown in the embodiment of FIGS. 1-4 and the embodiment of FIG. 5, the compensation voltage $V_{COMP}$ can be added at different points during signal processing to generate the command voltage $V_{CMD}$. The embodiment of FIGS. 1-4 shows the compensation voltage $V_{COMP}$ being added to the desired grid voltage $V_{GRID}*$ prior to the divide-by-N operation to generate the reference voltage $V_{REF}$, while the embodiment of FIG. 5 shows the compensation voltage $V_{COMP}$ being added to the output of the third adder 340 after the divide-by-N operation to generate the command voltage $V_{CMD}$.

Although not shown, the PWM pulses generated by the PWM generator 570 are provided to a power converter in the same way as the PWM pulses generated by the PWM generator 170 are provided to the power converter 130 in FIG. 1. In this way, the PWM pulses generated by the PWM generator 570 can be used to control the operation of a power converter using virtual impedance realization.

Voltage Measurement Circuits

As shown in FIGS. 1, 3, and 5, the PWM generator 170, 570 operates based on a value of a grid voltage $V_{GRID}$ that represents the voltage at the grid interface 150. A circuit must therefore be provided for the PWM generator 170, 570 to measure the grid voltage $V_{GRID}$.

FIG. 6 is a circuit diagram of a voltage measurement circuit 600 for a three-phase power system according to disclosed embodiments.

This measurement circuit 600 is used to capture the grid interface voltage of the power converter 130 when the power converter 130 generates three-phase power, and to remove the common mode voltage typically seen at the terminals of the converter 130. The measurement circuit 600 uses line-to-line voltage measurements, applies a physical circuit transformation to remove the common-mode voltage, and then provides the resulting phase-to-neutral voltages to the modulator 350 as the grid voltage $V_{GRID}$ with minimal phase delay. This provides an accurate voltage measurement typically without any additional computational delay time for the virtual impedance realization.

As shown in FIG. 6, the measurement circuit 600 includes a neutral voltage source 610, a first-phase voltage source 620A, a second-phase voltage source 620B, a third-phase voltage source 620C, a physical measurement circuit 630, and a PWM generation sub-system 640 the physical measurement circuit 630 includes a first differential voltage amplifier 650, a second differential voltage amplifier 655, and a transformation circuit 660. The PWM generation sub-system 640 includes a PWM generator 670.

The neutral voltage source 610 is an equivalent voltage source that is generated in the power converter 130, 530 due to the operation of the power converter, or at the grid interface due to other sources or loads in the grid; this source is connected to ground and appears as a neutral-to-ground voltage $V_{NG}$. This neutral-to-ground voltage $V_{NG}$ can be referred to as the common voltage and is dependent on grid configurations and power converter configuration and operating parameters.

The first-phase voltage source 620A is a voltage source at the power converter 130, 530 grid interface that is connected to the neutral voltage source 610 and generates a first line voltage $V_{AN}$ on a first line.

The second-phase voltage source 620B is a voltage source at the power converter 130, 530 grid interface that is connected to the neutral voltage source 610 and generates a second line voltage $V_{BN}$ on a second line.

The third-phase voltage source 620C is a voltage source at the power converter 130, 530 grid interface that is connected to the neutral voltage source 610 and generates a third line voltage $V_{CN}$ on a third line.

The physical measurement circuit 630 is connected to the outputs of the first-phase voltage source 620A, the second-phase voltage source 620B, and the third-phase voltage source 620C. It uses the outputs of these three voltage sources 620A, 620B, 620C to generate a plurality of line-to-line voltages $V_{AB}$, $V_{BC}$ and the grid voltage $V_{GRID}$. As shown in FIG. 6, the line-to-line voltages $V_{AB}$, $V_{BC}$ and the grid voltage $V_{GRID}$ can be provided to an external source such as a system controller, a power converter controller, a sampling circuit in a PWM generation circuit, or any element that requires these values.

The PWM generation sub-system 640 receives the grid voltage $V_{GRID}$ and a reference voltage $V_{REF}$ and uses these to voltages to generate a series of PWM pulses that are adjusted based on a virtual impedance. The reference voltage $V_{REF}$ is generated based on a virtual impedance, as shown by the reference voltage generator 160 in FIG. 1. If the embodiment of FIG. 5 were used, the PWM generation sub-system 640 would also receive a compensation voltage $V_{COMP}$, as described with respect to the embodiment of FIG. 5.

The first differential voltage amplifier 650 receives the first line voltage $V_{AN}$ and the second line voltage $V_{BN}$ and generates a first line-to-line voltage $V_{AB}$ that is the difference between the first line voltage $V_{AN}$ and the second line voltage $V_{BN}$.

The second differential voltage amplifier 655 receives the second line voltage $V_{BN}$ and the third line voltage $V_{CN}$ and generates a second line-to-line voltage $V_{BC}$ that is the difference between the second line voltage $V_{BN}$ and the third line voltage $V_{CN}$.

The transformation circuit 660 performs a transformation function on the first line-to-line voltage $V_{AB}$ and the second line-to-line voltage $V_{BC}$ two generate a first line-to-neutral voltage $V_{AN}$, a second line-to-neutral voltage $V_{BN}$, and a third line-to-neutral voltage $V_{CN}$. The first line-to-neutral voltage $V_{AN}$ represents the voltage of the first line with respect to neutral; the second line-to-neutral voltage $V_{BN}$ represents the voltage of the second line with respect to neutral; and the third line-to neutral voltage $V_{CN}$ represents the voltage of the third line with respect to neutral. For a three-phase system, the first line-to-neutral voltage $V_{AN}$, the second line-to-neutral voltage $V_{BN}$, together and the third line-to neutral voltage $V_{CN}$ represent the grid voltage $V_{GRID}$.

One exemplary transfer function that could be used by the transformation circuit 660 is:

$$\begin{bmatrix} 2/3 & 1/3 \\ -1/3 & 1/3 \\ 1/3 & 2/3 \end{bmatrix}. \quad (1)$$

However, this is by way of example only. Other suitable transfer functions can be used in alternate embodiments.

The PWM generator 670 operates as the PWM generator 170 described with respect to the embodiment of FIG. 1, generating the PWM pulses necessary to control a power converter using the grid voltage $V_{GRID}$ and a reference voltage $V_{REF}$. If the embodiment of FIG. 5 were used, the PWM generator 670 would also receive a compensation voltage $V_{COMP}$, as described with respect to the embodiment of FIG. 5. In that case, the PWM generator 670 would generate the PWM pulses necessary to control a power converter using the grid voltage $V_{GRID}$, a reference voltage $V_{REF}$, and the compensation voltage $V_{COMP}$. This is comparable to the operation of the PWM generator 570 described above with respect to FIG. 5.

By calculating line-to-line voltages $V_{AB}$, $V_{BC}$ and applying the transfer function to these line-to-line voltages $V_{AB}$, $V_{BC}$ the physical measurement circuit 630 is able to generate the grid voltage $V_{GRID}$ as a set of line-to-neutral voltages $V_{AN}$, $V_{BN}$, $V_{CN}$ that can be used by the PWM generator 670 to generate the required PWM pulses for operating a power converter.

Although many power generation systems use three-phase power, the disclosed system and method for controlling voltage conversion using a virtual impedance can be equally applicable to a one-phase power generation system. FIG. 7 is a circuit diagram of a voltage measurement circuit 700 for a one-phase power system according to disclosed embodiments.

This measurement circuit 700 is used to capture the output voltage of the power converter 130 when the power converter 130 is used to generate one-phase power, and to remove the common mode voltage typically seen at the terminals of the converter 130. The measurement circuit 700 uses a phase-to-neutral voltage measurement, and then provides the resulting phase-to-neutral voltage to the modulator 350 as the grid voltage $V_{GRID}$ with minimal phase delay.

This provides an accurate voltage measurement without any additional computational delay time for the virtual impedance calculation.

As shown in FIG. 7, the measurement circuit 700 includes a neutral voltage source 710, a first-phase voltage source 720, a physical measurement circuit 730, and a PWM generation sub-system 740 the physical measurement circuit 730 includes a differential voltage amplifier 750. The PWM generation sub-system 740 includes a PWM generator 770.

The neutral voltage source 710 is an equivalent voltage source that is generated in the power converter 130, 530 due to the operation of the power converter or due to other sources or loads in the grid; this source is connected to ground and appears as a neutral-to-ground voltage $V_{NG}$. This neutral-to-ground voltage $V_{NG}$ can be referred to as the common voltage.

The first-phase voltage source 720 is a voltage source in the power converter 130, 530 that is connected to the neutral voltage source 710 and generates a first line voltage $V_{AN}$ on a first line.

The physical measurement circuit 730 is connected to the outputs of the neutral voltage source 710 (in a converter where the neutral N is accessible) and the first-phase voltage source 720. It uses the outputs of these two voltage sources 710, 720 to generate a line-to-neutral voltage $V_{AN}$, which is provided as the grid voltage $V_{GRID}$. As shown in FIG. 7, the grid voltage $V_{GRID}$ can be provided to an external source such as a system controller, a power converter controller, a sampling circuit in a PWM generation circuit, or any element that requires these values.

The PWM generation sub-system 740 receives the grid voltage $V_{GRID}$ and a reference voltage $V_{REF}$ and uses these two voltages to generate a series of PWM pulses that are adjusted based on a virtual impedance. The reference voltage $V_{REF}$ is generated based on a virtual impedance, as shown by the reference voltage generator 160 in FIG. 1. If the embodiment of FIG. 5 were used, the PWM generation sub-system 740 would also receive a compensation voltage $V_{COMP}$, as described with respect to the embodiment of FIG. 5.

The differential voltage amplifier 750 receives the neutral-to-ground voltage $V_{NG}$ and the first line voltage ($V_{AN}+V_{NG}$) at its other input and generates a line-to-neutral voltage $V_{AN}$ that is used as the grid voltage $V_{GRID}$.

The PWM generator 770 operates as the PWM generator 170 described with respect to the embodiment of FIG. 1, generating the PWM pulses necessary to control a power converter using the grid voltage $V_{GRID}$ and a reference voltage $V_{REF}$. If the embodiment of FIG. 5 were used, the PWM generator 770 would also receive a compensation voltage $V_{COMP}$, as described with respect to the embodiment of FIG. 5. In that case, the PWM generator 770 would generate the PWM pulses necessary to control a single phase of a power converter using the grid interface voltage $V_{GRID}$, a reference voltage $V_{REF}$, and the compensation voltage $V_{COMP}$ as described above with respect to FIG. 5.

By calculating line-to-neutral voltage $V_{AN}$ the physical measurement circuit 730 is able to generate the grid voltage $V_{GRID}$ as a line-to-neutral voltage $V_{AN}$ that can be used by the PWM generator 770 to generate the required PWM pulses for controlling a power converter.

Virtual Impedance Converter Operation

Figure 8:
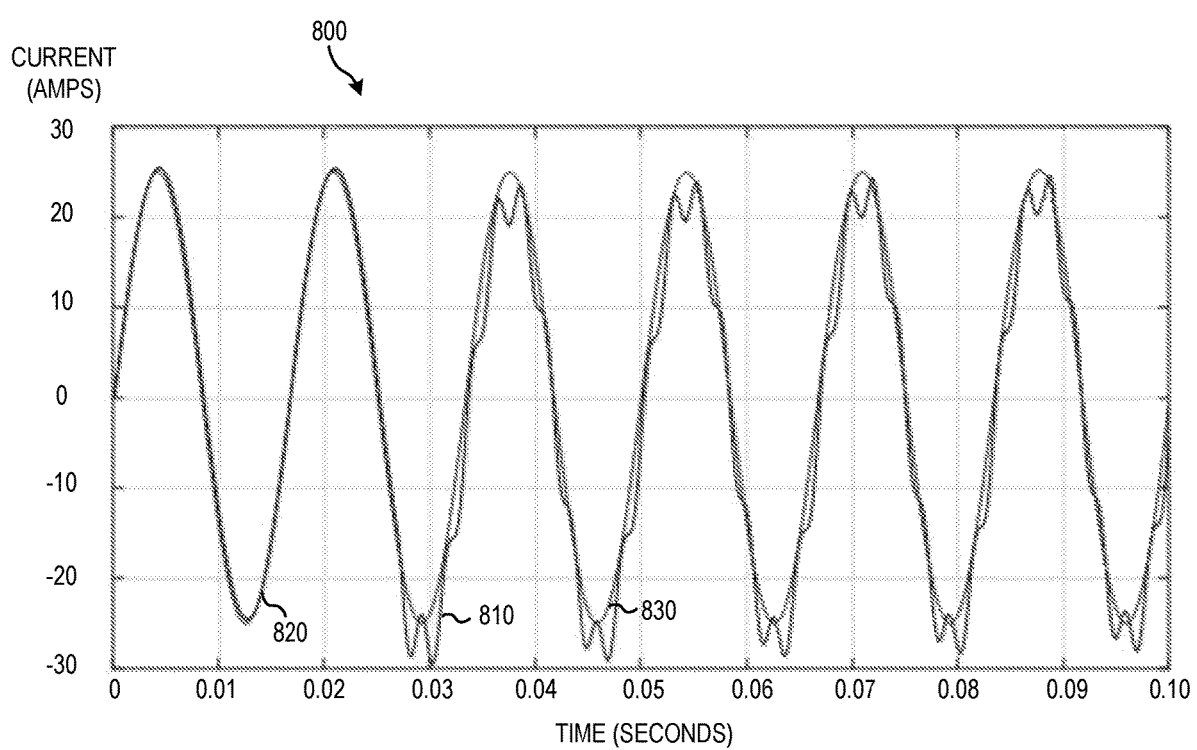
FIG. 8 is a graph of an output current of a virtual impedance power converter according to disclosed embodiments.

FIG. 8 is a graph 800 of an output current of a virtual-impedance-based power converter according to disclosed embodiments. This graph 800 illustrates an example of the effect a voltage-based virtual impedance can have on an output current of a grid-connected inverter.

As shown in FIG. 8, three curves are disclosed: the output of a conventional impedance modulator 810 in which there is no compensation during a transient at the grid interface and the converter continues to operate with distortion, the output of a converter with physical impedance realization equal to the virtual impedance 820, and the output of a converter with virtual impedance realization 830. In the graph 800, a disturbance is added to the grid voltage at a time of 25 ms.

The conventional impedance modulator 810, without any impedance realization, suffers from high harmonic content after the disturbance is added and becomes distorted.

The converter with physical impedance realization equal to the virtual impedance 820 limits the distortion of the current from the inverter, providing a relatively undistorted current curve and limiting distortion of the current from the inverter. Such a converter would require a physically massive filter and excessive internal voltages for operation.

The impedance modulator with virtual impedance realization 830 likewise limits the distortion of the current from the inverter, also providing a relatively undistorted current curve and limiting distortion of the current from the inverter. The physical filter remains unchanged and there is no change in the physical voltage levels of the power converter.

The physical impedance realization 820 curve and the virtual impedance realization 830 curve are extremely similar and appear to overlap on the graph 800. This represents that both physical impedance realization and virtual impedance realization are effective in compensating for current distortion. Thus, as shown in FIG. 8, a power converter with voltage-based virtual impedance realization provides a similar correction effect as an impedance modulator with physical impedance realization.

However, although physical impedance realization and virtual impedance realization are both effective, a physical impedance realization circuit would be very difficult, inefficient and expensive to implement, whereas a virtual impedance realization circuit can easily be constructed. Therefore, virtual impedance realization is greatly preferred.

Methods of Operation

Figure 9:
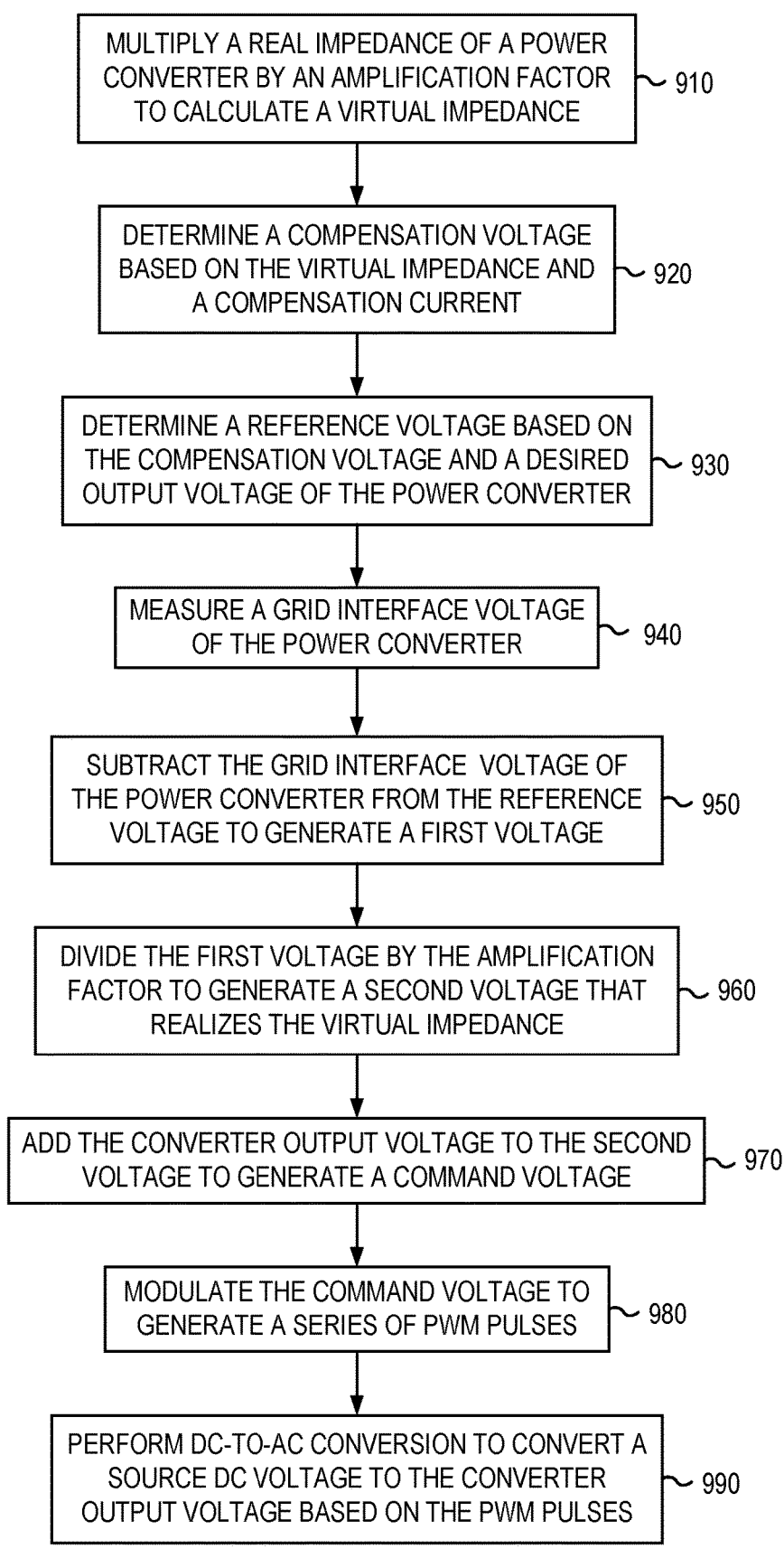
FIG. 9 is a flow chart of an operation of realizing a virtual impedance according to one of the disclosed embodiments.

FIG. 9 is a flow chart 900 of an operation of realizing a virtual impedance according to disclosed embodiments.

As shown in FIG. 9, the operation 900 begins by multiplying a real output impedance of a power converter by an amplification factor to calculate a virtual impedance (910). The real output impedance of the power converter can be determined by an impedance value of an LR output filter at the output of the power converter. The amplification factor can be any positive value, though the disclosed embodiment selects the application factor to be a real number between 1 and 250.

A compensation voltage is then determined based on the virtual impedance and a compensation current (920). This compensation current can be a desired grid interface current for the power converter whose real output impedance is used to generate the virtual impedance.

A reference voltage is then generated based on the compensation voltage and a desired grid interface voltage of the power converter (930). This desired grid interface voltage of the power converter is selected to achieve desired operation parameters for the power converter.

A real grid interface voltage of the power converter is then measured (940). Because of processing delays, this measured and sampled real grid interface voltage of the power converter may be delayed from a real-time grid interface voltage of the power converter.

The real grid interface voltage of the power converter is then subtracted from the reference voltage to generate a first voltage (950).

The first voltage is then divided by the amplification factor to generate a second voltage that realizes the virtual impedance (960). This application factor is the same amplification factor that is multiplied by the real output impedance to generate the virtual impedance.

The real grid interface voltage is then added to the second voltage to generate a command voltage (970).

The command voltage is then modulated to generate a series of pulse width modulation (PWM) pulses (980).

Finally, DC-to-AC conversion is performed to convert a source DC voltage to the AC real output voltage based on the PWM pulses (990).

In this way, by selecting the value of the amplification factor, the operation can modify the effective impedance used to generate the PWM pulses from the real output impedance of the power converter to a desired virtual impedance, which may or may not be the same as the real output impedance of the power converter.

In an alternative embodiment, the reference voltage can be set to be equal to the desired grid interface voltage of the power converter. In this case, the compensation voltage would be added to the sum of the real grid interface voltage and the second voltage to generate the command voltage. This alternate embodiment simply moves the position at which the compensation voltage is added into the signal processing.

This virtual impedance implementation method can be implemented in power converters for both single-phase and three-phase systems to enhance stability and decoupling. This method is also applicable to minimizing harmonics on the system, as the amplification of the voltage-based virtual impedance method will enable a converter to minimize disturbances outside the commanded output including frequency deviations. This can be differentiated from other converter manufacturers by physically measuring two attributes. First, the voltage measurement circuit provides feedback simultaneously to a local modulator gate board or to a modulator sub-system, as well as a system level controller. Second, since the disclosed voltage-based virtual impedance method amplifies both the resistive and inductive impedances of the filter, the power factor at the terminals will stay constant at the power factor of the filter circuit with varying values of virtual impedance. In contrast, a current-based state of the art (SOA) virtual impedance would implement just the programmed resistive or inductor portion of the virtual impedance, resulting in a varying power factor as the programmed virtual impedances are modified.

Figure 10:
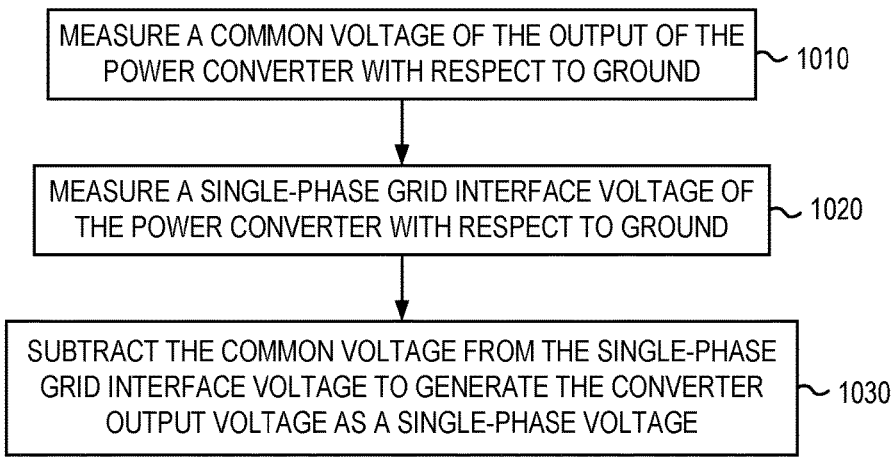
FIG. 10 is a flow chart of the operation of determining a real grid interface voltage of a power converter in the operation of FIG. 9 according to disclosed embodiments.

FIG. 10 is a flow chart of the operation 940 of determining a real grid interface voltage of a power converter in the operation of FIG. 9 according to disclosed embodiments. Specifically, FIG. 10 is a flow chart of the operation 940 of determining a grid interface voltage of a power converter that generates single-phase power or a multi-phase converter where neutral is accessible for measurement.

As disclosed in FIG. 10, the operation 940 begins by measuring a common voltage of the output of the power converter with respect to grid interface system ground (1010).

A single-phase grid interface voltage of the power converter is then measured (1020) with respect to grid interface system ground. Different of the neutral voltage with respect to ground and single-phase grid interface voltage with respect to ground is a grid interface phase-to-neutral voltage.

The common voltage is than subtracted from the single-phase output voltage to generate a line-to-neutral single-phase voltage that is used as the real grid interface voltage of the power converter (1030). The real grid interface voltage can then be subtracted from the reference voltage and added to the second voltage as described above with respect to FIG. 9.

Figure 11:
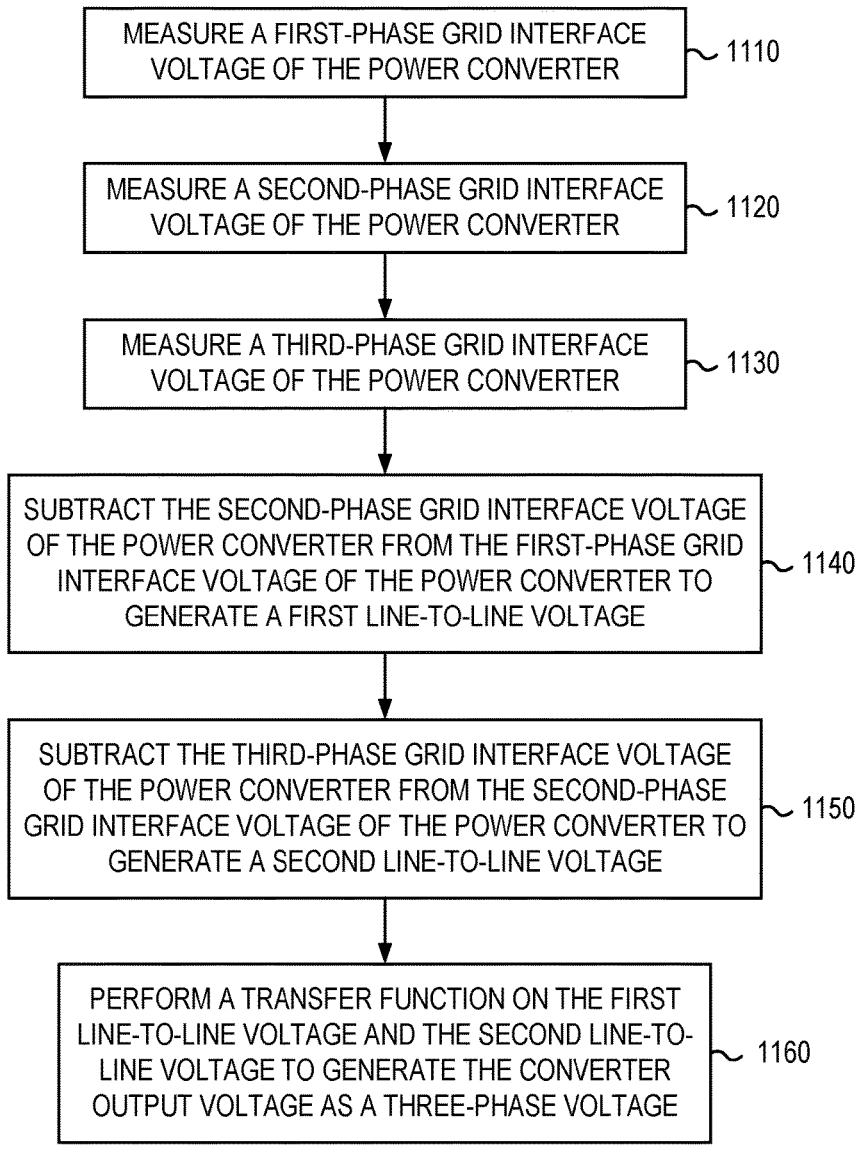
FIG. 11 is a flow chart of the operation of determining a real grid interface voltage of a power converter in the operation of FIG. 9 according to alternate disclosed embodiments.

FIG. 11 is a flow chart of the operation 940 of determining a real grid interface voltage of a power converter in the operation of FIG. 9 according to alternate disclosed embodiments. Specifically, FIG. 11 is a flow chart of the operation 940 of a power converter that generates three-phase power.

As disclosed in FIG. 11, the operation 940 begins by measuring a first-phase grid interface voltage of the power converter (1110), measuring a second-phase grid interface voltage of the power converter (1120), and measuring a third grid interface voltage of the power converter is then measured (1130).

The second-phase grid interface voltage of the power converter is then subtracted from the first-phase grid interface voltage of the power converter to generate a first line-to-line of voltage (1140).

The third-phase grid interface voltage of the power converter is then subtracted from the second-phase grid interface voltage of the power converter to generate a second line-to-line of voltage (1150).

A transfer function is then performed on the first line-to-line voltage and the second line-to-line voltage to generate the real grid interface voltage as a three-phase voltage (1160). This three-phase real grid interface voltage will include three line-to-neutral voltages, one for each phase. The real grid interface voltage can then be subtracted from the reference voltage and added to the second voltage as described above with respect to FIG. 9.

One exemplary transfer function that could be used by this operation is:

$$\begin{bmatrix} 2/3 & 1/3 \\ -1/3 & 1/3 \\ -1/3 & -2/3 \end{bmatrix}. \qquad (1)$$

However, this is by way of example only. Other suitable transfer functions can be used in alternate embodiments.

Figure 12:
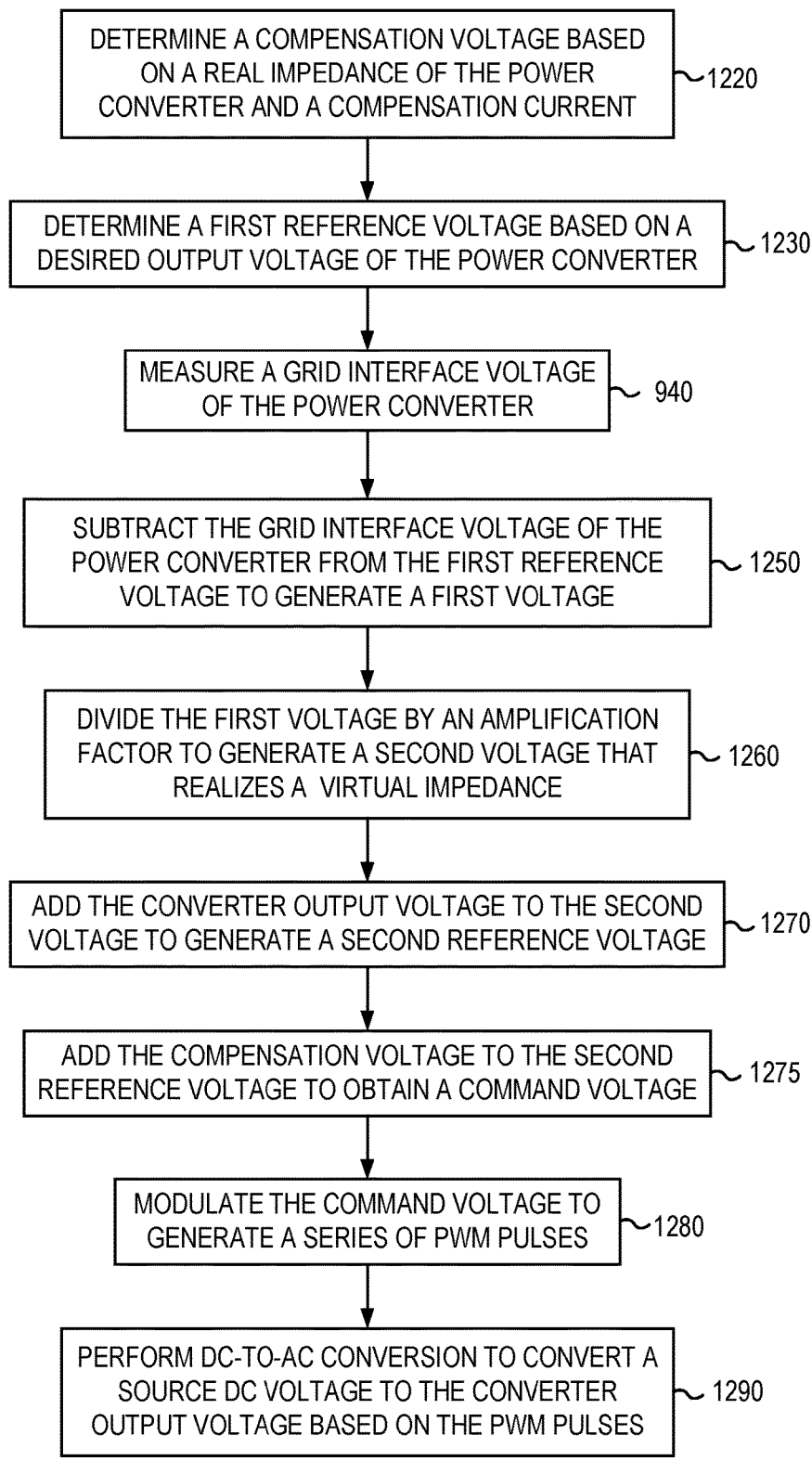
FIG. 12 is a flow chart of an operation of realizing a virtual impedance according to alternate disclosed embodiments.

FIG. 12 is a flow chart 1200 of an operation of realizing a virtual impedance according to alternate disclosed embodiments.

As shown in FIG. 12, the operation 1200 begins by determining a compensation voltage based on the real impedance of a power converter and a compensation current (1220). This compensation current can be a desired grid interface current for the power converter.

A first reference voltage is then generated based on a desired grid interface voltage of the power converter (1230). This desired grid interface voltage of the power converter is selected to achieve desired operation parameters for the power converter.

A real grid interface voltage of the power converter is then measured (940). Because of processing delays, this measured and sampled real grid interface voltage of the power converter may be delayed from a real-time grid interface voltage of the power converter. This operation is comparable to the operation 940 in FIG. 9, and the embodiments of FIGS. 10 and 11 are applicable to this operation.

The real grid interface voltage of the power converter is then subtracted from the first reference voltage to generate a first voltage (1250).

The first voltage is then divided by an amplification factor to generate a second voltage that realizes the virtual impedance (1260). The amplification factor can be any positive value, though the disclosed embodiment selects the application factor to be a real number between 1 and 250.

The real grid interface voltage is then added to the second voltage to generate a second reference voltage (1270).

The second reference voltage is then added to the compensation voltage to generate a command voltage (1275).

The command voltage is then modulated to generate a series of pulse width modulation (PWM) pulses (1280).

Finally, DC-to-AC conversion is performed to convert a source DC voltage to the AC real output voltage based on the PWM pulses (1290).

In this way, by selecting the value of the amplification factor, the operation can modify the effective impedance used to generate the PWM pulses from the real output impedance of the power converter to a desired virtual impedance, which may or may not be the same as the real output impedance of the power converter.

This virtual impedance implementation method can be implemented in power converters for both single-phase and three-phase systems to enhance stability and decoupling. This method is also applicable to minimizing harmonics on the system, as the amplification of the voltage-based virtual impedance method will enable a converter to minimize disturbances outside the commanded output including frequency deviations. This can be differentiated from other converter manufacturers by physically measuring two attributes. First, the voltage measurement circuit provides feedback simultaneously to a local modulator gate board or to a modulator sub-system, as well as a system level controller. Second, since the disclosed voltage-based virtual impedance method amplifies both the resistive and inductive impedances of the filter, the power factor at the terminals will stay constant at the power factor of the filter circuit with varying values of virtual impedance. In contrast, a current-based state of the art (SOA) virtual impedance would implement just the programmed resistive or inductor portion of the virtual impedance, resulting in a varying power factor as the programmed virtual impedances are modified.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits integrated circuits, or software as desired by implementation.

What is claimed:

1. A power converter controller for virtual impedance realization, comprising:

a sampling circuit configured to sample a real grid interface voltage at grid interface terminals of a power converter;

a first operation block configured to perform a first operation on a reference voltage signal and a sampled real grid interface voltage signal of the power converter to generate a first voltage signal;

a second operation block configured to perform a second operation on the first voltage signal to generate a second voltage signal; and a third operation block configured to perform a third operation on the sampled real grid interface voltage signal, the second voltage signal, and a third voltage signal to generate a command voltage signal for controlling the power converter, wherein the first operation block is a subtractor, the second operation block is an arithmetic division by an amplification factor and the amplification factor is a real number between 1 and 250, and the third operation block is an adder, and the first operation is a subtraction operation, the second operation is a division operation, and the third operation is an addition operation.

2. The power converter controller of claim 1, further comprising:

a modulator configured to modulate the command voltage signal to generate a series of pulse width modulation (PWM) pulses.

3. The power converter controller of claim 1, further comprising:

a reference voltage generator configured to generate the reference voltage signal based on a virtual impedance, a desired grid interface current, a desired grid interface output voltage for the power converter, and a fourth voltage signal, wherein the virtual impedance is equal to a real impedance of the power converter multiplied by the amplification factor, and the third voltage signal has a value of zero.

4. The power converter controller of claim 3, wherein the reference voltage generator further comprises:

a multiplier configured to multiply the real impedance of the power converter by the amplification factor to generate the virtual impedance;

a voltage generator configured to generate a compensation voltage based on the virtual impedance and the desired grid interface current; and an adder configured to add the desired grid interface output voltage for a power converter and the compensation voltage to generate the reference voltage signal.

5. The power converter controller of claim 1, further comprising:

a reference voltage generator configured to generate the reference voltage signal based on a desired grid interface output voltage for a power converter and a fourth voltage signal equal to a compensation voltage.

6. The power converter controller of claim 5, wherein the reference voltage generator further comprises:

a compensation voltage generator configured to generate the compensation voltage based on a real impedance and a desired grid interface current.

7. The power converter controller of claim 1, wherein the sampling circuit further comprises:

a physical measurement circuit configured to generate the sampled real grid interface voltage signal of the power converter based on one or more line-to-line voltages or line-to-ground voltages from the grid interface of the power converter.

8. The power converter controller of claim 7, wherein the physical measurement circuit further comprises:
an amplifier configured to subtract a common mode grid interface voltage signal of the power converter from line grid interface voltage signals to generate the real grid interface voltage signal of the power converter.

9. The power converter controller of claim 7, wherein the physical measurement circuit further comprises:
a first amplifier configured to subtract a second-phase grid interface voltage of the power converter from a first-phase grid interface voltage of the power converter to generate a first line-to-line voltage signal;
a second amplifier configured to subtract a third-phase grid interface voltage of the power converter from the second-phase grid interface voltage of the power converter to generate a second line-to-line voltage signal; and
a conversion circuit configured to generate the real grid interface voltage signal of the power converter as a three-phase voltage signal based on the first line-to-line voltage, the second line-to-line voltage, and a transfer function.

10. The power converter controller of claim 9, wherein the transfer function is Y=[A]X, $$[A] \text{ is } \begin{bmatrix} 2/3 & 1/3 \\ -1/3 & 1/3 \\ -1/3 & -2/3 \end{bmatrix},$$

X is the first and second line-to-line voltages, and
Y is the real grid interface voltage signal.

11. A power conversion system, comprising:
a power converter configured to convert a DC power voltage to an AC grid voltage based on a series of pulse width modulation (PWM) pulses;
a power converter controller including
a sampling circuit configured to sample a grid interface voltage of the power converter to generate a real grid interface voltage signal for the power converter;
a first operation block configured to perform a first operation on a reference voltage signal and the real grid interface voltage of the power converter to generate a first voltage signal;
a second operation block configured to perform a second operation on the first voltage signal to generate a second voltage signal;
a third operation block configured to perform a third operation on the real grid interface voltage signal, the second voltage signal, and a third voltage signal to generate a command voltage signal; and
a modulator configured to modulate the command voltage signal to generate the series of PWM pulses
wherein
the first operation block is a subtractor, the second operation block is an arithmetic division by an amplification factor and the amplification factor is a real number between 1 and 250, and the third operation block is an adder, and the first operation is a subtraction operation, the second operation is a division operation, and the third operation is an addition operation.

12. The power conversion system of claim 11, further comprising:
a reference voltage generator configured to generate the reference voltage signal based on a virtual impedance, a desired grid interface current, and a desired grid interface voltage for the power converter, and a fourth voltage signal,
wherein the virtual impedance is equal to a real impedance of the power converter multiplied by the amplification factor, and
the third voltage signal has a value of zero.

13. The power conversion system of claim 12, wherein the reference voltage generator further comprises:
a multiplier configured to multiply the real impedance of the power converter by the amplification factor to generate the virtual impedance;
a voltage generator configured to generate a compensation voltage signal based on the virtual impedance and the desired grid interface current; and
an adder configured to add the desired grid interface voltage for the power converter and the compensation voltage signal to generate the reference voltage signal.

14. The power conversion system of claim 12, wherein the reference voltage generator further comprises a compensation voltage generator configured to generate the third voltage signal based on the real impedance and the desired grid interface current.

15. The power conversion system of claim 11, wherein the sampling circuit further comprises:
a physical measurement circuit configured to generate the real grid interface voltage signal of the power converter based on one or more line-to-line voltages from the output of the power converter.

16. The power conversion system of claim 15, wherein the physical measurement circuit further comprises:
an amplifier configured to subtract a common voltage from a single-phase grid interface voltage of the power converter to generate the real grid interface voltage signal of the power converter.

17. The power conversion system of claim 15, wherein the physical measurement circuit further comprises:
a first amplifier configured to subtract a second-phase output voltage of the power converter from a first-phase output voltage of the power converter to generate a first line-to-line voltage;
a second amplifier configured to subtract a third-phase output voltage of the power converter from the second-phase output voltage of the power converter to generate a second line-to-line voltage; and
a conversion circuit configured to generate the real grid interface voltage signal of the power converter as a three-phase voltage based on the first line-to-line voltage, the second line-to-line voltage, and a transfer function.

18. The power conversion system of claim 17, wherein the transfer function is Y=[A]X, $$[A] \text{ is } \begin{bmatrix} 2/3 & 1/3 \\ -1/3 & 1/3 \\ -1/3 & -2/3 \end{bmatrix},$$

X is the first and second line-to-line voltages, and
Y is the real grid interface voltage signal.

19. A method of realizing a virtual impedance, comprising:
- multiplying a real impedance of a power converter by an amplification factor to generate a virtual impedance;
- determining a compensation voltage based on the virtual impedance and a desired grid interface current;
- determining a reference voltage based on the compensation voltage and a desired grid interface voltage of the power converter;
- subtracting a real grid interface voltage of the power converter from the reference voltage to generate a first voltage;
- dividing the first voltage by the amplification factor to generate a second voltage;
- adding the real grid interface voltage to the second voltage to generate a command voltage; and
- performing a DC-to-AC conversion to convert a source DC voltage to the real grid interface voltage at an output of DC-to-AC conversion based on the command voltage,
- wherein the amplification factor is a real number greater than 1.

20. The method of claim 19, wherein the operation of performing the DC-to-AC conversion to convert the source DC voltage to the real grid interface voltage based on the command voltage further comprises:
- modulating the command voltage to generate a series of pulse width modulation (PWM) pulses; and
- performing the DC-to-AC conversion to convert the source DC voltage to the real grid interface voltage at the output of DC-to-AC conversion based on the PWM pulses.

21. The method of claim 19, wherein the PWM pulses set the duty cycle of the power converter.

22. The method of claim 19, wherein
the amplification factor is a real number between 1 and 250.

23. The method of claim 19, wherein
the reference voltage is determined by adding the compensation voltage to the desired grid interface voltage of the power converter.

24. The method of claim 19, further comprising:
determining the real grid interface voltage of the power converter based on one or more line-to-line voltages from an output of the power converter.

25. The method of claim 24, wherein:
the determining of the real grid interface voltage is performed by subtracting a common voltage from a single-phase grid interface voltage of the power converter to generate the real grid interface voltage of the power converter.

26. The method of claim 24, wherein:
the determining of the real grid interface voltage is performed by
- subtracting a second-phase output voltage of the power converter from a first-phase output voltage of the power converter to generate a first line-to-line voltage;
- subtracting a third-phase output voltage of the power converter from the second-phase output voltage of the power converter to generate a second line-to-line voltage; and
- generating the real grid interface voltage of the power converter as a three-phase voltage based on the first line-to-line voltage, the second line-to-line voltage, and a transfer function.

27. The method of claim 26, wherein
the transfer function is Y=[A]X, $$[A] \text{ is } \begin{bmatrix} 2/3 & 1/3 \\ -1/3 & 1/3 \\ 1/3 & 2/3 \end{bmatrix},$$

X is the first and second line-to-line voltages, and
Y is the real grid interface voltage signal.

* * * * *